US012775704B2

(12) United States Patent
Monteuuis et al.

(10) Patent No.: US 12,775,704 B2
(45) Date of Patent: Oct. 27, 2026

(54) PLAUSIBILITY AND CONSISTENCY CHECKERS FOR VEHICLE APPARATUS CAMERAS

(71) Applicant: QUALCOMM Incorporated, San Diego, CA (US)

(72) Inventors: Jean-Philippe Monteuuis, Northborough, MA (US); Hong Cai, San Diego, CA (US); Jonathan Petit, Wenham, MA (US); Mohammad Raashid Ansari, Saugus, MA (US); Cong Chen, San Diego, CA (US); Hyojin Park, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 18/528,445

(22) Filed: Dec. 4, 2023

(65) Prior Publication Data

US 2025/0181711 A1 Jun. 5, 2025

(51) Int. Cl.

| | |
|---|---|
| ***G06F 21/55*** | (2013.01) |
| ***G06T 7/70*** | (2017.01) |
| ***G06V 10/764*** | (2022.01) |

(52) U.S. Cl.

CPC .............. *G06F 21/554* (2013.01); *G06T 7/70* (2017.01); *G06V 10/764* (2022.01)

(58) Field of Classification Search

CPC ..................... G06F 21/554; G06T 7/70; G06T 2207/20081; G06T 2207/20084;

(Continued)

(56) References Cited

U.S. PATENT DOCUMENTS

| | | | |
|---|---|---|---|
| 10,733,718 | B1 | 8/2020 | Lerman et al. |
| 2020/0151505 | A1 | 5/2020 | Saito et al. |

(Continued)

OTHER PUBLICATIONS

B. Nassi et al., "Enabling object detectors to better distinguish between real and fake objects in semi-autonomous and fully autonomous vehicles", Communications of the ACM | Apr. 2023 | vol. 66 | No. 4, 12 pages.

(Continued)

*Primary Examiner* — Wasika Nipa
*Assistant Examiner* — Edgar W Xie
(74) *Attorney, Agent, or Firm* — Polsinelli LLP

(57) ABSTRACT

Various embodiments include methods for processing an image from an apparatus camera to recognize potentially malicious attacks on the camera. Various embodiments may include processing an image received from a camera of the apparatus using a plurality of different trained image processing models or vision pipelines to obtain a plurality of different image processing outputs, and performing a plurality of consistency checks on the plurality of different image processing outputs. Such consistency checks compare two or more selected outputs of the plurality of different outputs to detect inconsistencies that may be associated with or due to an attack on the camera. Indications of an attack on a camera may be reported to and considered by an autonomous driving system of the apparatus or otherwise addressed in one or more mitigation actions.

20 Claims, 14 Drawing Sheets

(58) Field of Classification Search
CPC ............ G06T 7/11; G06T 2207/10016; G06T 2207/30261; G06T 7/73; G06T 2207/10028; G06T 2210/12; G06T 7/10; G06T 7/246; G06T 2207/30252; G06T 7/50; G06V 10/764; G06V 10/765; G06V 10/762; G06V 10/82; G06V 20/58; G06V 10/25; G06V 20/70; G06V 20/10; G06V 10/774; G06V 20/56; G06V 10/7715; G06V 20/64; G06V 2201/07; G06V 10/22; G06V 10/225; G06V 20/41
See application file for complete search history.

(56) References Cited

U.S. PATENT DOCUMENTS

| | | | | |
|---|---|---|---|---|
| 2021/0181757 | A1* | 6/2021 | Goel | G06T 7/579 |
| 2021/0185067 | A1 | 6/2021 | Sureda et al. | |
| 2021/0248241 | A1 | 8/2021 | Balkanski et al. | |
| 2021/0287387 | A1* | 9/2021 | Deegan | G06T 7/10 |
| 2022/0036126 | A1 | 2/2022 | Gaidon et al. | |
| 2022/0318570 | A1 | 10/2022 | Soryal et al. | |
| 2023/0015771 | A1 | 1/2023 | Nassi et al. | |
| 2023/0343108 | A1 | 10/2023 | Hemantharaja | |
| 2024/0161333 | A1* | 5/2024 | Milioris | G06V 10/761 |
| 2024/0233328 | A1* | 7/2024 | Hofman | G06V 10/764 |
| 2024/0331449 | A1 | 10/2024 | Cintas et al. | |
| 2024/0371134 | A1 | 11/2024 | Avraham et al. | |
| 2025/0028821 | A1* | 1/2025 | Koseki | G06F 21/554 |
| 2025/0095373 | A1 | 3/2025 | Monteuuis et al. | |

OTHER PUBLICATIONS

Ka-Ho Chow, "Robust Object Detection Fusion Against Deception" KDD '21, Aug. 14-18, 2021, Virtual Event, Singapore, 11 pages.

Man et al., "That Person Moves Like A Car: Misclassification Attack Detection for Autonomous Systems Using Spatiotemporal Consistency", Univ. of Arizone, Purdue Univ and Virginia Tech; Man, Y., Muller, R., Li, M., Celik, Z. B., & Gerdes, R. In USENIX Security Symposium, pp. 1-18, 2023.

U.S. Appl. No. 18/470,924, filed in the USPTO on Sep. 20, 2023, 82 pages, Assignee: Qualcomm Incorporated.

Man Y., et al., "Remote Perception Attacks against Camera-based Object Recognition Systems and Countermeasures", ACM Transactions on Cyber-Physical Systems, ACM, 2 Penn Plaza, Suite 701, New York NY, 10121-0701 USA, May 17, 2023, pp. 1-26, XP059176771, Sections 7.1-7.4.

Man Y., et al., "That Person Moves Like A Car: Misclassification Attack Detection for Autonomous Systems Using Spatiotemporal Consistency", USENIX, The Advanced Computing Systems Association, 19 Pages, Aug. 15, 2023, pp. 1-19, XP061082880, Sections 2.1-5.2.

International Search Report and Written Opinion—PCT/US2024/056749—ISA/EPO—Feb. 3, 2025.

Man Y., et al., "That Person Moves Like A Car: Misclassification Attack Detection for Autonomous Systems Using Spatiotemporal Consistency", Usenix, Usenix, the Advanced Computing Systems Association Aug. 15, 2023, 19 Pages, XP061082880, Sections 4.1 and 4.2; figure 3.

Nassi B., et al., "Protecting Autonomous Cars from Phantom Attacks", ARXIV:2003.08934V1, United States, vol. 66, No. 4, Mar. 23, 2023, pp. 56-69, XP059332051, p. 62, Right-hand Column—p. 64, Left-hand Column, figure 5.

Nesti F., et al., "Evaluating the Robustness of Semantic Segmentation for Autonomous Driving Against Real-World Adversarial Patch Attacks", arXiv:2108.06179v1 [cs.CV], Cornell University Library, 201 Olin Library Cornell University Ithaca, NY 14853, pp. 1-10, Aug. 13, 2021, XP091035148, Abstract, Section 3, Section 4.

* cited by examiner

PLAUSIBILITY AND CONSISTENCY CHECKERS FOR VEHICLE APPARATUS CAMERAS

BACKGROUND

With the advent of autonomous and semi-autonomous vehicles, robotic vehicles, and other types of mobile apparatuses that use advanced driver assistance systems (ADAS) and autonomous driving systems (ADS), apparatuses with such systems are becoming vulnerable to a new form of malicious behavior and threats; namely spoofing or otherwise attacking the camera systems that are at the heart of autonomous vehicle navigation and object avoidance. While such attacks may be rare presently, with the expansion of apparatuses with autonomous driving systems, it is expected that such attacks may become a significant problem in the future.

SUMMARY

Various aspects include methods that may be implemented on a processing system of an apparatus and systems for implementing the methods for checking the plausibility and/or consistency of cameras used in (ADS) and advanced driver assistance systems (ADAS) cameras to identify potential malicious attacks. Various aspects may include processing an image received from a camera of the apparatus using a plurality of trained image processing models to obtain a plurality of image processing outputs, performing a plurality of consistency checks on the plurality of image processing outputs, wherein a consistency check of the plurality of consistency checks compares each of the plurality of different outputs to detect an inconsistency, detecting an attack on the camera based on the inconsistency, and performing a mitigation action in response to recognizing the attack.

In some aspects, processing of the image received from the camera the apparatus using a plurality of trained image processing models to obtain a plurality of image processing outputs may include performing semantic segmentation processing on the image using a trained semantic segmentation model to associate masks of groups of pixels in the image with classification labels, performing depth estimation processing on the image using a trained depth estimation model to identify distances to objects in the images, performing object detection processing on the image using a trained object detection model to identify objects in the images and define bounding boxes around identified objects, and performing object classification processing on the image using a trained object classification model to classify objects in the images.

In some aspects, performing the plurality of consistency checks on the plurality of image processing outputs may include performing a semantic consistency check comparing classification labels associated with masks from semantic segmentation processing with bounding boxes of object detections in the image from object detection processing to identify inconsistencies between mask classifications and detected objects, and providing an indication of detected classification inconsistencies in response to a mask classification being inconsistent with a detected object in the image.

Some aspects may further include in response to classification labels associated with masks from semantic segmentation processing being consistent with bounding boxes of object detections from object detection processing, performing a location consistency check comparing locations within the image of classification masks from semantic segmentation processing with locations within the image of bounding boxes of object detections in the images from object detection processing to identify inconsistencies in locations of classification masks with detected object bounding boxes, and providing an indication of detected classification inconsistencies if locations of classification masks are inconsistent with locations of detected object bounding boxes within the image.

In some aspects, performing the plurality of consistency checks on the plurality of image processing outputs may include performing depth plausibility checks comparing depth estimations of detected objects from object detection processing with depth estimates of individual pixels or groups of pixels from depth estimation processing to identify distributions in depth estimations of pixels across a detected object that are inconsistent with depth distributions associated with a classification of a mask encompassing the detected object from semantic classification processing, and providing an indication of a detected depth inconsistency if distributions in depth estimations of pixels across a detected object from depth distributions associated with a classification of a mask.

In some aspects, performing the plurality of consistency checks on the plurality of image processing outputs may include performing a context consistency check comparing depth estimations of a bounding box encompassing a detected object from object detection processing with depth estimations of a mask encompassing the detected object from semantic segmentation processing to determine whether distributions of depth estimations of the mask differ from depth estimations of the bounding box, and providing an indication of a detected context inconsistency if the distributions of depth estimations of the mask are the same as or similar to distributions of depth estimations of the bounding box.

In some aspects, performing the plurality of consistency checks on the plurality of image processing outputs may include performing a label consistency check comparing a detected object from object detection processing with a label of the detect object from object classification processing to determine whether the object classification label is consistent with the detect object, and providing an indication of detected label inconsistencies if the object classification label is inconsistent with the detected object.

In some aspects, performing a mitigation action in response to recognizing the attack may include adding indications of inconsistencies from each of the plurality of consistency checks to information regarding each detected object that provided is to an autonomous driving system for tracking detected objects. In some aspects, performing a mitigation action in response to recognizing the attack may include reporting the detected attack to a remote system.

Further aspects include an apparatus, such as a vehicle, including a memory and a processor configured to perform operations of any of the methods summarized above. Further aspects may include an apparatus, such as a vehicle having various means for performing functions corresponding to any of the methods summarized above. Further aspects may include a non-transitory processor-readable storage medium having stored thereon processor-executable instructions configured to cause one or more processors of an apparatus processing system to perform various operations corresponding to any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
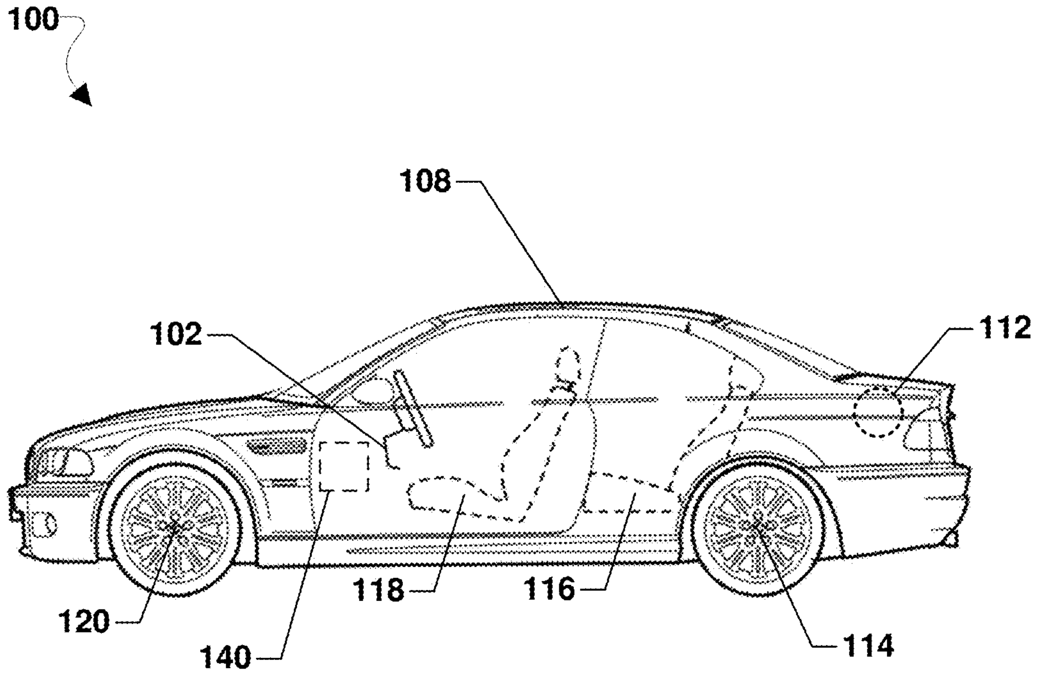
FIGS. 1A-1C are component block diagrams illustrating systems typical of an autonomous apparatus in the form of a vehicle that are suitable for suitable for implementing various embodiments.

Various embodiments will be described in detail with reference to the accompanying drawings. Wherever possible, the same reference numbers will be used throughout the drawings to refer to the same or like parts. References made to particular examples and embodiments are for illustrative purposes and are not intended to limit the scope of the claims.

Various embodiments include methods and vehicle processing systems for processing individual images to identify and respond to attacks on apparatus (e.g., vehicle) cameras, referred to herein as "vision attacks." Various embodiments address potential risks to apparatuses (e.g., vehicles) that could be posed by malicious vision attacks as well as inadvertent actions that cause images acquired by cameras to appear to include false objects or obstacles that need to be avoided, fake traffic signs, imagery that can interfere with depth and distance determinations, and similar misleading imagery that could interfere with the safe autonomous operation of an apparatus. Various embodiments provide methods for recognizing actual or potential vision attacks based on inconsistencies in individual images including semantic classification inconsistencies, semantic classification location inconsistencies, depth plausibility inconsistencies, context inconsistencies, and label inconsistencies. When a vision attack or likely attack is recognized, some embodiments include the processing system performing one or more mitigation actions to address or accommodate a vision attack on a camera in ADS or ADAS operations, and/or reporting detected attacks to an external third party, such as law enforcement or highway maintenance authorities, so the attack can be stopped.

Various embodiments may improve the operational safety of autonomous and semi-autonomous apparatuses (e.g., vehicles) by providing effective methods and systems for detecting malicious attacks on camera systems, and taking mitigating actions such as to reduce risks to the vehicle, output an indication, and/or report attacks to appropriate authorities.

The terms "onboard" or "in-vehicle" are used herein interchangeably to refer to equipment or components contained within, attached to, and/or carried by an apparatus (e.g., a vehicle or device that provides a vehicle functionality). Onboard equipment typically includes a processing system that may include one or more processors, SOCs, and/or SIPs, any of which may include one or more components, systems, units, and/or modules that implement the functionality (collectively referred to herein as a "processing system" for conciseness). Aspects of onboard equipment and functionality may be implemented in hardware components, software components, or a combination of hardware and software components.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. An SIP may also include multiple independent SOCs coupled together via high-speed communication circuitry and packaged in close proximity, such as on a single motherboard or in a single wireless device. The proximity of the SOCs facilitates high speed communications and the sharing of memory and resources.

The term "apparatus" is used herein to refer to any of a variety of devices, system and equipment that may use camera vision systems, and thus be potentially vulnerable to vision attacks. Some non-limiting examples of apparatuses to which various embodiments may be applied include autonomous and semiautonomous vehicles, mobile robots, mobile machinery, autonomous and semiautonomous farm equipment, autonomous and semiautonomous construction and paving equipment, autonomous and semiautonomous military equipment, and the like.

As used herein, the term "processing system" is used herein to refer to one or more processors, including multicore processors, that are organized and configured to perform various computing functions. Various embodiment methods may be implemented in one or more of multiple processors within any of a variety of vehicle computers and processing systems as described herein.

As used herein, the term "semantic segmentation" encompasses image processing, such as via a trained model, to associate individual pixels or groups of pixels in a digital image with a classification label, such as "trees," "traffic sign," "pedestrian," "roadway," "building," "car," "sky," etc. Coordinates of groups of pixels may be in the form of "masks" associated with classification labels within an image, with masks defined by coordinates (e.g., pixel coordinates) within an image or coordinates and area within the image.

Camera systems and image processing plays a critical role in current and future autonomous and semiautonomous apparatuses, such as the ADS or ADAS system implemented in autonomous and semiautonomous vehicles, mobile robots, mobile machinery, autonomous and semiautonomous farm equipment, etc. In such apparatuses, multiple cameras may provide images of the roadway and surrounding scenery, providing data that is useful for navigation (e.g., roadway following), object recognition, collision avoidance, and hazard detection. The processing of image data in modern ADS or ADAS systems has progressed far beyond basic object recognition and tracking to include understanding information posted on street signs, understanding roadway conditions, and navigating complex roadway situations (e.g., turning lanes, avoiding pedestrians and bicyclists, maneuvering around traffic cones, etc.).

The processing of camera data fields involves a number of tasks (sometimes referred to as "vision tasks") that are crucial to safe operations of autonomous apparatus, such as vehicles. Among the vision tasks that camera systems typically perform in support of ADS and ADAS operations are semantic segmentation, depth estimation, object detection and object classification. These image processing operations are central to supporting basic navigation ADS/ADAS operations, including roadway tracking with depth estimation to enable path planning, object detection in three dimensions (3D), object identification or classification, traffic sign recognition (including temporary traffic signs and signs reflected in map data), and panoptic segmentation.

In modern ADS and ADAS systems, camera images may be processed by multiple different analysis engines in what is sometimes referred to as a "vision pipeline." To recognize and understand the scene around an apparatus (e.g., a vehicle), the multiple different analysis engines in a vision pipeline are typically neural network type artificial intelligence/machine learning (AI/ML) modules that are trained to perform different analysis tasks on image data and output information of particular types. For example, such trained AI/ML analysis modules in a vision pipeline may include a model trained to perform semantic segmentation analysis on individual images, a model trained to perform depth estimates of pixels, groups of pixels and areas/bounding boxes on objects within images, a model trained to perform object detection (i.e., detect objects within an image), and a model trained to perform object classification (i.e., determine and assign a classification to detected objects). Such trained AI/ML analysis modules may analyze image frames and sequences of images to identify and interpret objects in real-time. The information outputs of these image processing trained models may be combined to generate a data structure of information to identify and track objects with camera images (e.g., in a tracked object data structure) that can be used by the apparatus ADS or ADAS processors to support navigation, collision avoidance, and follow traffic procedures (e.g., traffic signs or signals).

An important operation achieved through processing of image data in a vision pipeline is object detection and classification (i.e., recognizing and understanding the meaning or implications of objects). In addition to detecting objects, the location of detected objects in three-dimensions (3D) with respect to the apparatus is important for navigation and collision avoidance. Examples of objects that ADS and ADAS operation need to be identified, classified, and in some cases interpreted or understood include traffic signs, pedestrians, other vehicles, roadway obstacles, roadway boundaries and traffic lane lines, and roadway features that differ from information included in detailed map data and observed during prior driving experiences.

Traffic signs are a type of object that needs to be recognized, categorized, and processed to understand displayed writing (e.g., speed limit) in autonomous vehicle applications. This processing is needed to enable the guidance and regulations identified by the sign to be included in the decision-making of the autonomous driving system. Typically, traffic signs have a recognizable shape depending upon the type of information that is displayed (e.g., stop, yield, speed limit, etc.). However, sometimes the displayed information differs from the meaning or classification corresponding to the shape, such as text in different languages, observable shapes that are not actually traffic signs (e.g., advertisements, T-shirt designs, protest signs, etc.). Also, traffic signs may identify requirements or regulations (e.g., speed limits or traffic control) that are inconsistent with information that appears in map data that the ADS or ADAS may be relying upon.

Pedestrians and other vehicles are important objects to detect, classify, and track closely to avoid collisions and properly plan a vehicle's path. Classifying pedestrians and other vehicles may be useful in predicting the future positions or trajectories of those objects, which is important for future planning performed by the autonomous driving system.

In addition to recognizing, classifying, and obtaining information regarding detected objects, image data may be processed in a manner that allows tracking the location of these objects from frame to frame so that the trajectory of the objects with respect to the apparatus (or the apparatus with respect to the objects) can be determined to support navigation and collision avoidance functions.

Vision attacks, as well as confusing or conflicting imagery that could mislead the image analysis processes of autonomous driving systems, can come from a number of different sources and involve a variety of different kinds of attacks. Vision attacks may target the semantic segmentation operations, depth estimations, and/or object detection and recognition functions of important image processing functions of ADS or ADAS systems. Vision attacks may include projector attacks and patch attacks.

In projector vision attacks, imagery is projected upon vehicle cameras by a projector with the intent of creating false or misleading image data to confuse an ADS or ADAS. For example, a projector may be used to project onto the roadway an image that, when viewed in the two-dimensional vision plane of the camera, appears to be three-dimensional and resembles an object that needs to be avoided. An example of this type of attack would be a projection onto the roadway of a picture or shape resembling a pedestrian (or other object) that when viewed from the perspective of the vehicle camera appears to be a pedestrian in the roadway. Another example is a projector that projects imagery onto structures along the roadway, such as projecting an image of stop sign on a building wall that is otherwise blank. Another example is a projector aimed directly at the apparatus cameras that injects imagery (e.g., false traffic signs) into the images.

Examples of patch vision attacks include images of recognizable objects, such as traffic signs, that are false, inappropriate, or in places where such objects should not appear. For example, a T-shirt with a stop sign image on it could confuse an autonomous driving system regarding whether the vehicle should stop or ignore the sign, especially if the person wearing the shirt is walking or running and not at or near an intersection. As another example, images or confusing shapes on the back end of a vehicle could confuse the image processing module that estimates depth and 3D positions of objects.

While some methods have been proposed for dealing with image distortions and interference, no comprehensive, multifactored methods have been identified. Thus, camera-based ADS or ADAS operations remain vulnerable to a number of vision attacks.

Various embodiments provide an integrated security solution to address the threats posed by attacks on apparatus cameras supporting autonomous driving and maneuvering systems based on the analysis of individual images from an apparatus camera. Various embodiments include the use of multiple different kinds of consistency checks (sometimes referred to as detectors) that can recognize inconsistencies in the output of different image processing that are part of an ADS/ADAS image analysis and object tracking processes. As used herein, the term "image processing" refers to computational and neural network processing that is performed by an apparatus, such as a vehicle ADS or ADAS system, on apparatus camera images to yield data (referred to generally herein as image processing "outputs") that provides information in a format that is needed for object detection, collision avoidance, navigation and other functions of the apparatus systems. Examples of image processing encompassed in this term may include multiple different types of processes that output different types of information, such as depth estimates to individual and groups of pixels, object recognition bounding box coordinates, object recognition labels, etc. Consistency checkers may compare two or more outputs of the image processing modules or vision pipelines to identify differences in the outputs that reveal inconsistent analysis results or conclusions. Each of the consistency checkers or detectors may compare outputs of selected different camera vision pipelines to identify/recognize inconsistencies in the respective outputs. By doing so, the system of consistency checkers is able to recognize vision attacks in single images. Some example consistency checkers include depth plausibility checks, semantic consistency checks, location inconsistency checks, context consistency checks, and label consistency checks; however, other embodiments may use more or fewer consistency checkers, such as comparing shapes of a detected objects to object classification and/or semantic segmentation mask labels.

In depth plausibility checks, depth estimates of individual pixels or groups of pixels from depth estimation processing performed on pixels of semantic segmentation masks and identified objects are compared to determine whether distributions in depth estimations of pixels across a detected object are consistent or inconsistent with depth distributions across the semantic segmentation mask. By estimating the depth to individual pixels or groups of pixels, a distribution of depth estimates for objects detected in digital images can be obtained. For a single solid object (e.g., a vehicle, pedestrian, etc.), the distribution of pixel depth estimations spanning the object should narrow (i.e., depth estimates vary by a small fraction or percentage). In contrast, an object that is not solid (e.g., a projection on the roadway, a banner with a hole in the middle, what appears to be a vehicle with a void through it, etc.) may exhibit a broad distribution of pixel depth estimates (i.e., depth estimates for some pixels differ by more than a threshold fraction or percentage from the average depth estimates of the rest of the pixels encompassing the detected object). By analyzing pixel depth estimates for detected objects to recognize when an object exhibits a distribution of depth estimates that exceed a threshold difference, fraction, or percentage (i.e., a depth estimate inconsistency), objects with implausible depth distributions can be recognized, which may indicate that the detected object is not what it appears to be (e.g., a projection vs. a real object, a banner or sign showing an object vs. an actual object, etc.), and thus indicative of a vision attack.

In semantic consistency checks, the outputs of semantic segmentation processing of an image may be compared to bounding boxes around detected objects from object detection processing to determine whether labels assigned to semantic segmentation masks are consistent or inconsistent with detected object bounding boxes. For example, the semantic segmentation process or vision pipeline may label each mask with a category label (e.g., "trees," "traffic sign," "pedestrian," "roadway," "building," "car," "sky," etc.) and object detection processing/vision pipeline and/or object classification processing may identify objects using a neural network AI/ML model that has been trained on an extensive training dataset of images including objects that have been assigned ground truth labels. In semantic consistency checks, a mask label from semantic segmentation that differs from or does not encompass the label assigned in object detection/object classification processing would be recognized as an inconsistency.

In location inconsistency checks, which may be performed if semantic consistency checks finds that mask labels are consistent with detected object bounding boxes, the locations within the image of semantic segmentation masks are in similar locations or overlap within the bounding boxes of detected objects within a threshold amount. Masks and bounding boxes may be of different sizes so a ratio of area overlap may be less than one. However, provided the masks and bounding boxes appears in approximately the same location in the image, the ratio of area overlap may be equal to or greater than a threshold overlap value that is set to recognize when there is insufficient overlap for the masks and bounding boxes to be for the same object. If the overlap ratio is less than the threshold overlap value, this may indicate that the semantic segmentation mask is focused on something different from a detected object, and thus that there is a semantic location inconsistency that may indicate an actual or potential vision attack.

In context consistency checks, the depth estimations of detected objects and depth estimation of the rest of the environment in the scene may be checked for inconsistencies indicative of a false image or spoofed object. In some embodiments, the checker or detector may compare the estimated depth values of pixels of a detected object or a mask encompassing the object to estimated depth values of pixels of an overlapping mask. In some embodiments, the checker or detector may compare the distribution of estimated pixel depth values spanning a detected object or bounding box encompassing the object to distribution of estimated pixel depth values spanning an overlapping mask, comparing differences to a threshold indicative of an actual or potential vision attack or otherwise actionable inconsistency.

In label consistency checks, detected objects from object detection processing may be compared with a label of the detect object obtained from object classification processing to determine whether the object classification label is consistent with the detect object. If the labels assigned to the same object or mask by the two labeling processes (semantic segmentation and object detection/classification) do not match or are in different distinct categories (e.g., "trees" vs. "automobile" or "traffic sign" vs. "pedestrian"), a label inconsistency may be recognized.

In some embodiments, the outputs of some or all of the different consistency checks may be a digital value, such as "1" or "0" to indicate whether an inconsistency in an image was detected or not. For example, a "0" may be output to indicate a genuine detected object within an image, and a "1" may be output to indicate an ingenuine detected object, malicious image data, a vision attack, or other indication of untrustworthy image data. In some embodiments, the outputs of some or all of the different consistency checks may include further information regarding detected inconsistencies, such an identifier of a detected object associated with an inconsistency, a pixel coordinate within the image of each detected inconsistency, a number of inconsistencies detected in a given image, and other types of information for identifying and tracking multiple inconsistencies detected in a given image.

The outputs of the inconsistency checks may then be used to determine if there a vision attack is happening or may be happening. In some embodiments, the results of all of the inconsistency checks may be considered in determining whether a vision attack is happening or may be happening. In some embodiments, individual inconsistency check results may be used to determine whether different types of vision attacks are happening or may be happening.

Some embodiments include performing one or more mitigation actions in response to determining that a vision attack is happening or may be happening. In some embodiments, the mitigation actions may involve appending information regarding the conclusions from individual inconsistency checks in data fields of object tracking information that is provided to an ADS or ADAS, thereby enabling that system to decide how to react to detected objects. For example, information regarding an object being tracked by the ADS or ADAS may include information regarding which if any of multiple inconsistency checks indicated an attack or unreliable information, which may assist the ADS/ADAS in determining how to navigate with respect to such an object. In some embodiments, an indication of detected inconsistencies in image processing results may be reported to an operator. In some embodiments, information indicating a vision attack determined based on one or more recognized inconsistency results may be communicated to a remote service, such as a highway administration, law enforcement, etc.

Figure 1B:
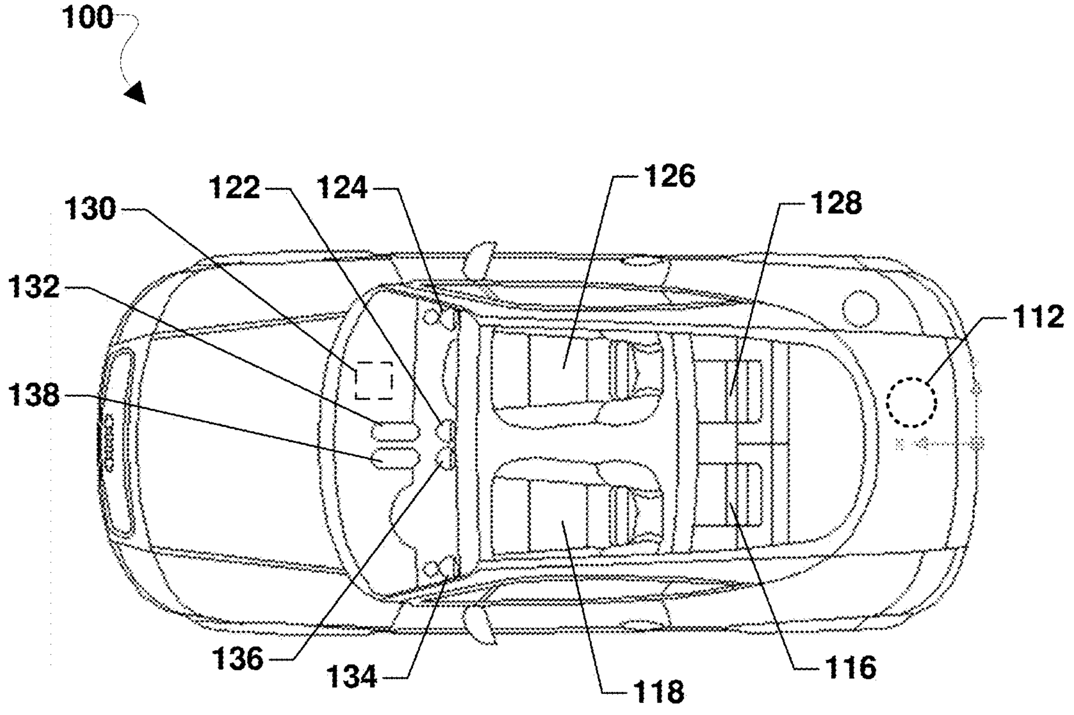

Various embodiments may be implemented within a variety of apparatuses, a non-limiting example of which in the form of a vehicle 100 is illustrated in FIGS. 1A and 1B. With reference to FIGS. 1A and 1B, a vehicle 100 may include a control unit 140, and a plurality of sensors 102-138, including satellite geopositioning system receivers 108, occupancy sensors 112, 116, 118, 126, 128, tire pressure sensors 114, 120, cameras 122, 136, microphones 124, 134, impact sensors 130, radar 132, and lidar 138. The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation, collision avoidance, and autonomous and semi-autonomous navigation and control. Each of the sensors 102-138 may be in wired or wireless communication with a control unit 140, as well as with each other. In particular, the sensors may include one or more cameras 122, 136 or other optical sensors or photo optic sensors. Cameras 122, 136 or other optical sensors or photo optic sensors may include outward facing sensors imaging objects outside the vehicle 100 and/or in-vehicle sensors imaging objects (including passengers) inside the vehicle 100. In some embodiments, the number of cameras may be less than two cameras or greater than two cameras. For example, there may be more than two cameras, such as two frontal cameras with different fields of view (FOVs), four side cameras, and two rear cameras. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, hazardous material sensors, microphones 124, 134 (inside or outside the vehicle 100), occupancy sensors 112, 116, 118, 126, 128, proximity sensors, and other sensors.

The vehicle control unit 140 may be configured with processor-executable instructions to perform operations of some embodiments using information received from various sensors, particularly the cameras 122, 136. In some embodiments, the control unit 140 may supplement the processing of a plurality of images using distance and relative position (e.g., relative bearing angle) that may be obtained from radar 132 and/or lidar 138 sensors. The control unit 140 may further be configured to control steering, breaking and speed of the vehicle 100 when operating in an autonomous or semi-autonomous mode using information regarding other vehicles determined using methods of some embodiments. In some embodiments, the control unit 140 may be configured to operate as an autonomous driving system (ADS). In some embodiments, the control unit 140 may be configured to operate as an automated driver assistance system (ADAS).

Figure 1C:
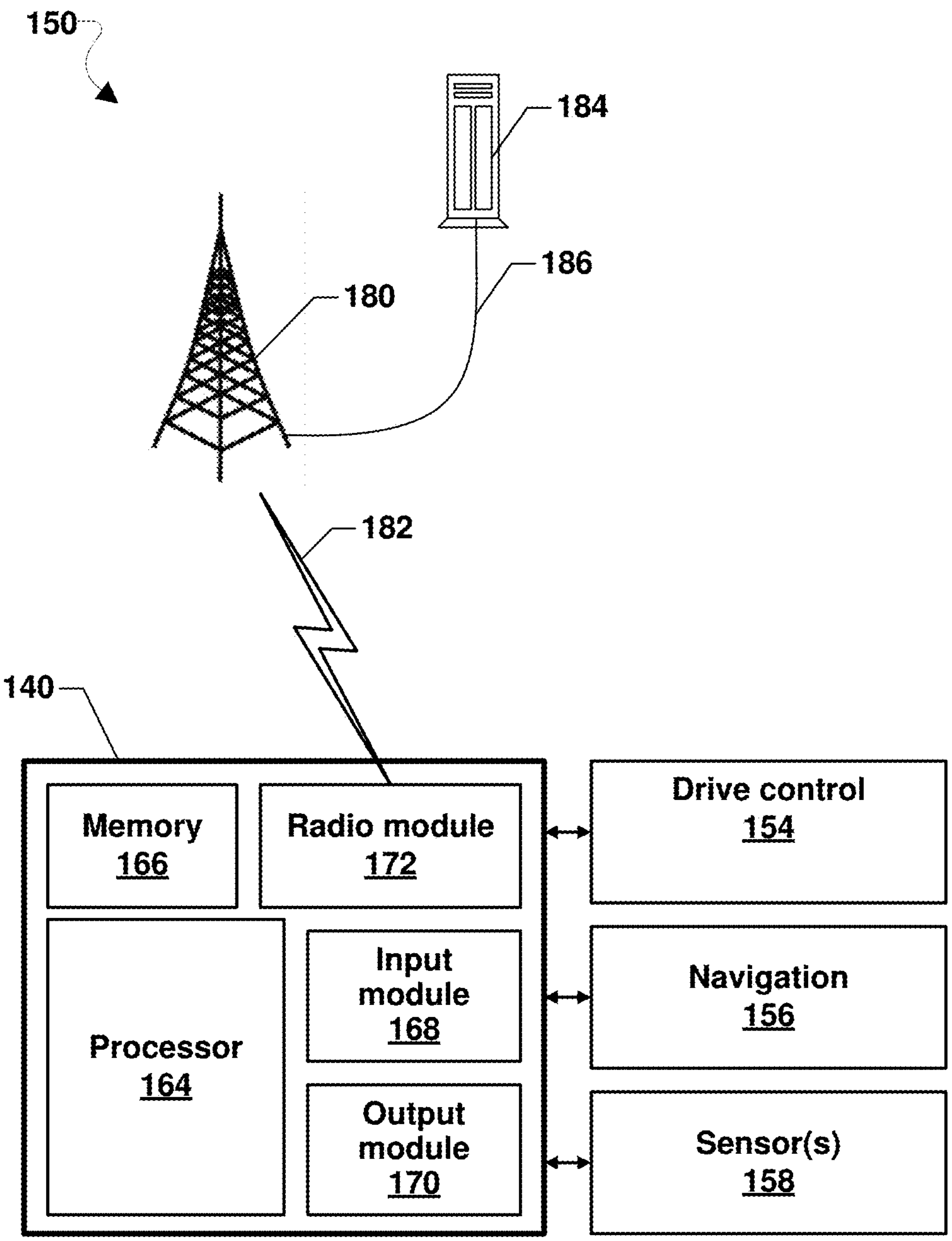

FIG. 1C is a component block diagram illustrating a system 150 of components and support systems suitable for implementing some embodiments. With reference to FIGS. 1A, 1B, and 1C, a vehicle 100 may include a control unit 140, which may include various circuits and devices used to control the operation of the vehicle 100. In the example illustrated in FIG. 1C, the control unit 140 includes a processor 164, memory 166, an input module 168, an output module 170 and a radio module 172. The control unit 140 may be coupled to and configured to control drive control components 154, navigation components 156, and one or more sensors 158 of the vehicle 100. The radio module 172 may be configured to communicate via wireless communication links 182 (e.g., 5G, etc.) with a base station 180 providing connectivity via a network 186 (e.g., the Internet) with a server 184 of a third party, such as a law enforcement of highway maintenance authority.

Figure 2:
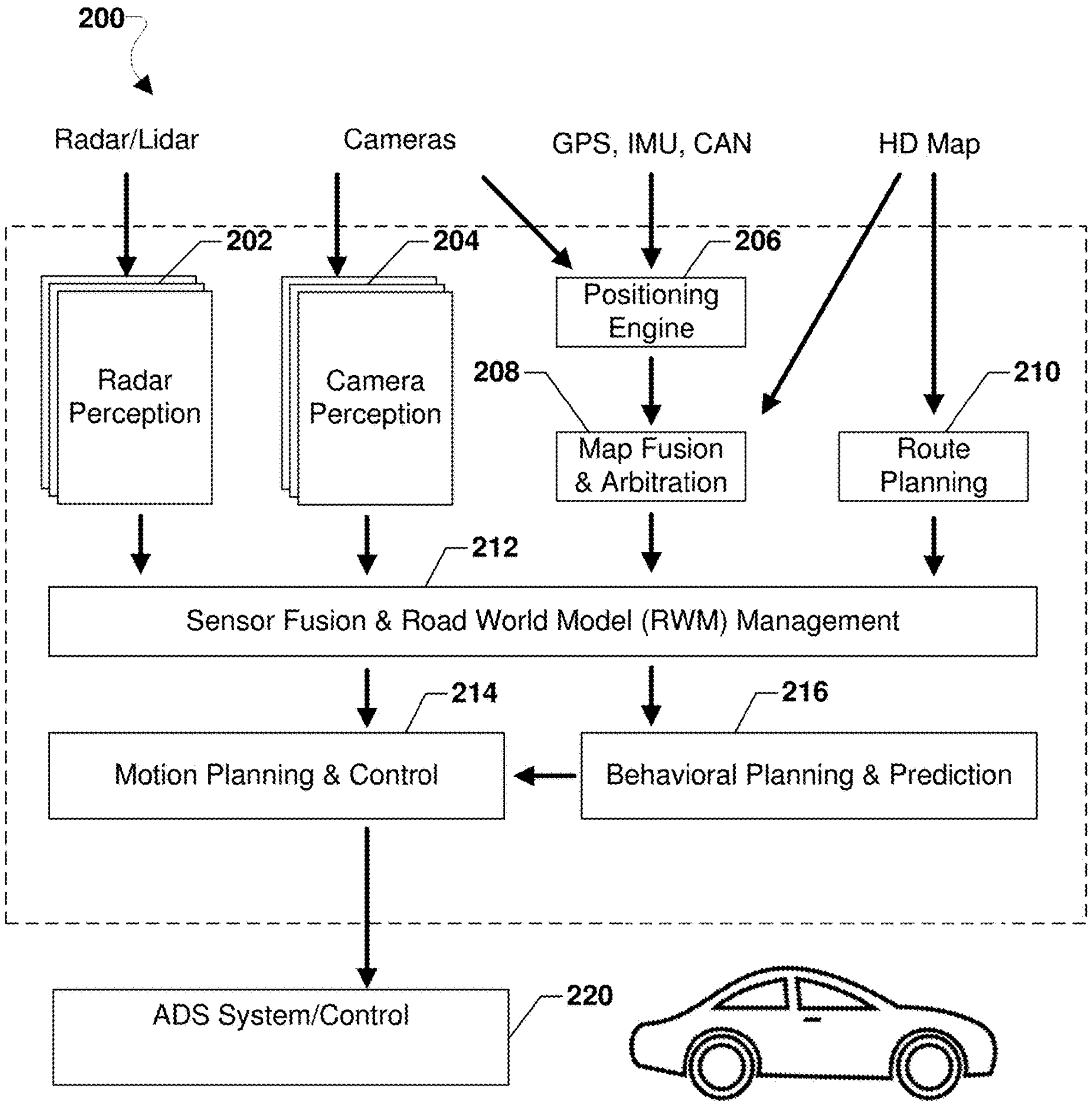
FIG. 2 is a functional block diagram showing functional elements or modules of an autonomous driving system suitable for implementing various embodiments.

FIG. 2 illustrates an example of subsystems, computational elements, computing devices, or units within an apparatus management system 200, which may be utilized within a vehicle 100. With reference to FIGS. 1A-2, in some embodiments, the various computational elements, computing devices or units within an apparatus management system 200 may be implemented within a system of interconnected computing devices (i.e., subsystems), that communicate data and commands to each other (e.g., indicated by the arrows in FIG. 2). In other embodiments, the various computational elements, computing devices, or units within vehicle management system 200 may be implemented within a single computing device, such as separate threads, processes, algorithms, or computational elements. Therefore, each subsystem/computational element illustrated in FIG. 2 is also generally referred to herein as "module" that may be implemented in one or more processing systems that make up the apparatus management system 200. However, the use of the term module in describing various embodiments in not intended to imply or require that the corresponding functionality is implemented within a single computing device or processing system of an ADS or ADAS apparatus management system, in multiple computing systems or processing systems, or a combination of dedicated hardware modules, software implemented modules and dedicated processing systems in a distributed apparatus computing system, although each are potential implementation embodiments. Rather, the use of the term "module" is intended to encompass subsystems with independent processing systems, computational elements (e.g., threads, algorithms, subroutines, etc.) running in one or more computing devices and processing systems, and combinations of subsystems and computational elements.

In various embodiments, the apparatus management system 200 may include a radar perception module 202, a camera perception module 204, a positioning engine module 206, a map fusion and arbitration module 208, a route planning module 210, sensor fusion and road world model (RWM) management module 212, motion planning and control module 214, and behavioral planning and prediction module 216.

The modules 202-216 are merely examples of some modules in one example configuration of the apparatus management system 200. In other configurations consistent with some embodiments, other modules may be included, such as additional modules for other perception sensors (e.g., LIDAR perception module, etc.), additional modules for planning and/or control, additional modules for modeling, etc., and/or certain of the modules 202-216 may be excluded from the apparatus management system 200.

Each of the modules 202-216 may exchange data, computational results, and commands with one another. Examples of some interactions between the modules 202-216 are illustrated by the arrows in FIG. 2. Further, the apparatus management system 200 may receive and process data from sensors (e.g., radar, lidar, cameras, inertial measurement units (IMU) etc.), navigation systems (e.g., global navigation satellite system (GNSS) receivers, IMUs, etc.), vehicle networks (e.g., Controller Area Network (CAN) bus), and databases in memory (e.g., digital map data). The apparatus management system 200 may output vehicle control commands or signals to the ADS or ADAS system/control unit 220, which is a system, subsystem or computing device that interfaces directly with vehicle steering, throttle, and brake controls.

The configuration of the apparatus management system 200 and ADS/ADAS system/control unit 220 illustrated in FIG. 2 is merely an example configuration and other configurations of a vehicle management system and other vehicle components may be used in some embodiments. As an example, the configuration of the apparatus management system 200 and ADS/ADAS system/control unit 220 illustrated in FIG. 2 may be used in an apparatus (e.g., a vehicle) configured for autonomous or semi-autonomous operation while a different configuration may be used in a non-autonomous apparatus.

The camera perception module 204 may receive data from one or more cameras, such as cameras (e.g., 122, 136), and process the data to recognize and determine locations of other vehicles and objects within a vicinity of the vehicle 100 and/or inside the vehicle 100 (e.g., passengers, etc.). The camera perception module 204 may include use of trained neural network processing modules implementing artificial intelligence methods to process image date to enable recognition, localization, and classification of objects and vehicles, and pass such information on to the sensor fusion and RWM trained model 212 and/or other modules of the ADS/ADAS system.

The radar perception module 202 may receive data from one or more detection and ranging sensors, such as radar (e.g., 132) and/or lidar (e.g., 138), and process the data to recognize and determine locations of other vehicles and objects within a vicinity of the vehicle 100. The radar perception module 202 may include use of neural network processing and artificial intelligence methods to recognize objects and vehicles, and pass such information on to the sensor fusion and RWM trained model 212 of the ADS/ADAS system.

The positioning engine module 206 may receive data from various sensors and process the data to determine a position of the vehicle 100. The various sensors may include, but are not limited to, a GNSS sensor, an IMU, and/or other sensors connected via a CAN bus. The positioning engine module 206 may also utilize inputs from one or more cameras, such as cameras (e.g., 122, 136) and/or any other available sensor, such as radars, LIDARs, etc.

The map fusion and arbitration module 208 may access data within a high definition (HD) map database and receive output received from the positioning engine module 206 and process the data to further determine the position of the vehicle 100 within the map, such as location within a lane of traffic, position within a street map, etc. The HD map database may be stored in a memory (e.g., memory 166). For example, the map fusion and arbitration module 208 may convert latitude and longitude information from GNSS data into locations within a surface map of roads contained in the HD map database. GNSS position fixes include errors, so the map fusion and arbitration module 208 may function to determine a best guess location of the vehicle within a roadway based upon an arbitration between the GNSS coordinates and the HD map data. For example, while GNSS coordinates may place the vehicle near the middle of a two-lane road in the HD map, the map fusion and arbitration module 208 may determine from the direction of travel that the vehicle is most likely aligned with the travel lane consistent with the direction of travel. The map fusion and arbitration module 208 may pass map-based location information to the sensor fusion and RWM trained model 212.

The route planning module 210 may utilize the HD map, as well as inputs from an operator or dispatcher to plan a route to be followed by the vehicle 100 to a particular destination. The route planning module 210 may pass map-based location information to the sensor fusion and RWM trained model 212. However, the use of a prior map by other modules, such as the sensor fusion and RWM trained model 212, etc., is not required. For example, other processing systems may operate and/or control the vehicle based on perceptual data alone without a provided map, constructing lanes, boundaries, and the notion of a local map as perceptual data is received.

The sensor fusion and RWM trained model 212 may receive data and outputs produced by the radar perception module 202, camera perception module 204, map fusion and arbitration module 208, and route planning module 210, and use some or all of such inputs to estimate or refine the location and state of the vehicle 100 in relation to the road, other vehicles on the road, and other objects within a vicinity of the vehicle 100 and/or inside the vehicle 100. For example, the sensor fusion and RWM trained model 212 may combine imagery data from the camera perception module 204 with arbitrated map location information from the map fusion and arbitration module 208 to refine the determined position of the vehicle within a lane of traffic. As another example, the sensor fusion and RWM trained model 212 may combine object recognition and imagery data from the camera perception module 204 with object detection and ranging data from the radar perception module 202 to determine and refine the relative position of other vehicles and objects in the vicinity of the vehicle. As another example, the sensor fusion and RWM trained model 212 may receive information from vehicle-to-vehicle (V2V) communications (such as via the CAN bus) regarding other vehicle positions and directions of travel, and combine that information with information from the radar perception module 202 and the camera perception module 204 to refine the locations and motions of other vehicles.

The sensor fusion and RWM trained model 212 may output refined location and state information of the vehicle 100, as well as refined location and state information of other vehicles and objects in the vicinity of the vehicle 100 or inside the vehicle 100, to the motion planning and control module 214, and/or the behavior planning and prediction module 216. As another example, the sensor fusion and RWM trained model 212 may apply facial recognition techniques to images to identify specific facial patterns inside and/or outside the vehicle.

As a further example, the sensor fusion and RWM trained model 212 may use dynamic traffic control instructions directing the vehicle 100 to change speed, lane, direction of travel, or other navigational element(s), and combine that information with other received information to determine refined location and state information. The sensor fusion and RWM trained model 212 may output the refined location and state information of the vehicle 100, as well as refined location and state information of other vehicles and objects in the vicinity of the vehicle 100 or inside the vehicle 100, to the motion planning and control module 214, the behavior planning and prediction module 216, and/or devices remote from the vehicle 100, such as a data server, other vehicles, etc., via wireless communications, such as through C-V2X connections, other wireless connections, etc.

As a further example, the sensor fusion and RWM trained model 212 may monitor perception data from various sensors, such as perception data from a radar perception module 202, camera perception module 204, other perception module, etc., and/or data from one or more sensors themselves to analyze conditions in the vehicle sensor data. The sensor fusion and RWM trained model 212 may be configured to detect conditions in the sensor data, such as sensor measurements being at, above, or below a threshold, certain types of sensor measurements occurring (e.g., a seat position moving, a seat height changing, etc.), and may output the sensor data as part of the refined location and state information of the vehicle 100 provided to the behavior planning and prediction module 216, and/or devices remote from the vehicle 100, such as a data server, other vehicles, etc., via wireless communications, such as through C-V2X connections, other wireless connections, etc.

The refined location and state information may include vehicle descriptors associated with the vehicle and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction module 216 of the apparatus management system 200 may use the refined location and state information of the vehicle 100 and location and state information of other vehicles and objects output from the sensor fusion and RWM trained model 212 to predict future behaviors of other vehicles and/or objects. For example, the behavioral planning and prediction module 216 may use such information to predict future relative positions of other vehicles in the vicinity of the vehicle based on own vehicle position and velocity and other vehicle positions and velocity. Such predictions may take into account information from the HD map and route planning to anticipate changes in relative vehicle positions as host and other vehicles follow the roadway.

The behavioral planning and prediction module 216 may output other vehicle and object behavior and location predictions to the motion planning and control module 214. Additionally, the behavior planning and prediction module 216 may use object behavior in combination with location predictions to plan and generate control signals for controlling the motion of the vehicle 100. For example, based on route planning information, refined location in the roadway information, and relative locations and motions of other vehicles, the behavior planning and prediction module 216 may determine that the vehicle 100 needs to change lanes and accelerate, such as to maintain or achieve minimum spacing from other vehicles, and/or prepare for a turn or exit. As a result, the behavior planning and prediction module 216 may calculate or otherwise determine a steering angle for the wheels and a change to the throttle setting to be commanded to the motion planning and control module 214 and ADS system/control unit 220 along with such various parameters necessary to effectuate such a lane change and acceleration. One such parameter may be a computed steering wheel command angle.

The motion planning and control module 214 may receive data and information outputs from the sensor fusion and RWM trained model 212 and other vehicle and object behavior as well as location predictions from the behavior planning and prediction module 216, and use this information to plan and generate control signals for controlling the motion of the vehicle 100 and to verify that such control signals meet safety requirements for the vehicle 100. For example, based on route planning information, refined location in the roadway information, and relative locations and motions of other vehicles, the motion planning and control module 214 may verify and pass various control commands or instructions to the ADS system/control unit 220.

The ADS system/control unit 220 may receive the commands or instructions from the motion planning and control module 214 and translate such information into mechanical control signals for controlling wheel angle, brake, and throttle of the vehicle 100. For example, ADS system/control unit 220 may respond to the computed steering wheel command angle by sending corresponding control signals to the steering wheel controller.

The ADS system/control unit 220 may receive data and information outputs from the motion planning and control module 214 and/or other modules in the apparatus management system 200, and based on the received data and information outputs determine whether an event a decision maker in the vehicle 100 is to be notified about is occurring.

Figure 3:
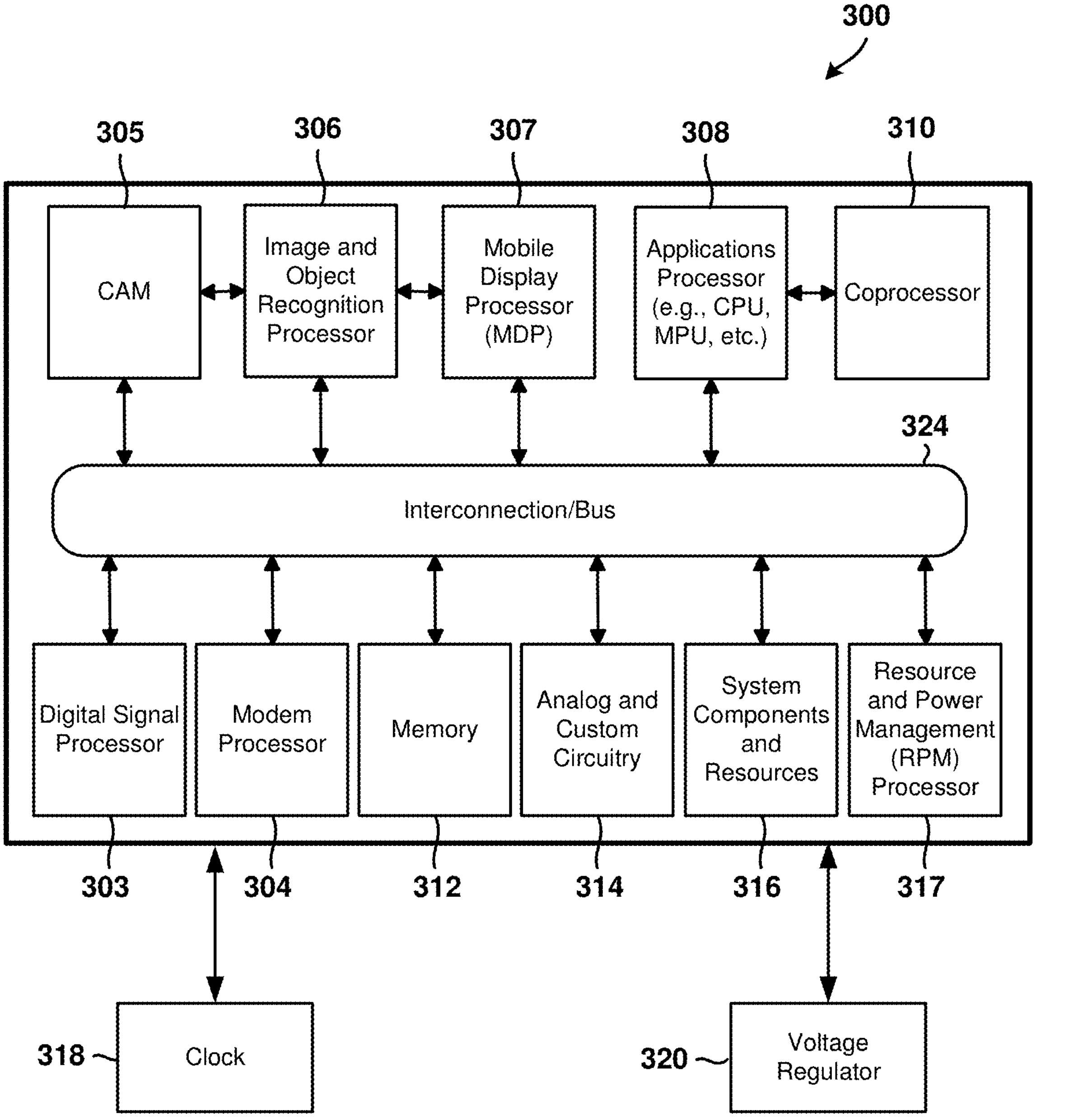
FIG. 3 is a component block diagram of a processing system suitable for implementing various embodiments.

FIG. 3 is a block diagram illustrating an example of components of a system on chip (SOC) 300 for use in a processing system (e.g., a V2X processing system) for use in performing operations in an apparatus in accordance with various embodiments. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317.

Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also may include specialized circuitry for camera actuation and management (CAM) 305 that includes, provides, controls and/or manages the operations of one or more cameras (e.g., a primary camera, webcam, 3D camera, etc.), the video display data from camera firmware, image processing, video preprocessing, video front-end (VFE), in-line JPEG, high-definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras via the CAM 305 to recognize and/or identify other vehicles. In some embodiments, the processor 306 may be configured to process radar or lidar data.

The system components and resources 316, analog and custom circuitry 314, and/or CAM 305 may include circuitry to interface with peripheral devices, such as cameras, radar, lidar, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, satellite navigation system receivers, communications circuitry (e.g., Bluetooth®, WLAN, Wi-Fi, etc.), and other well-known components of modern electronic devices.

Figure 4A:
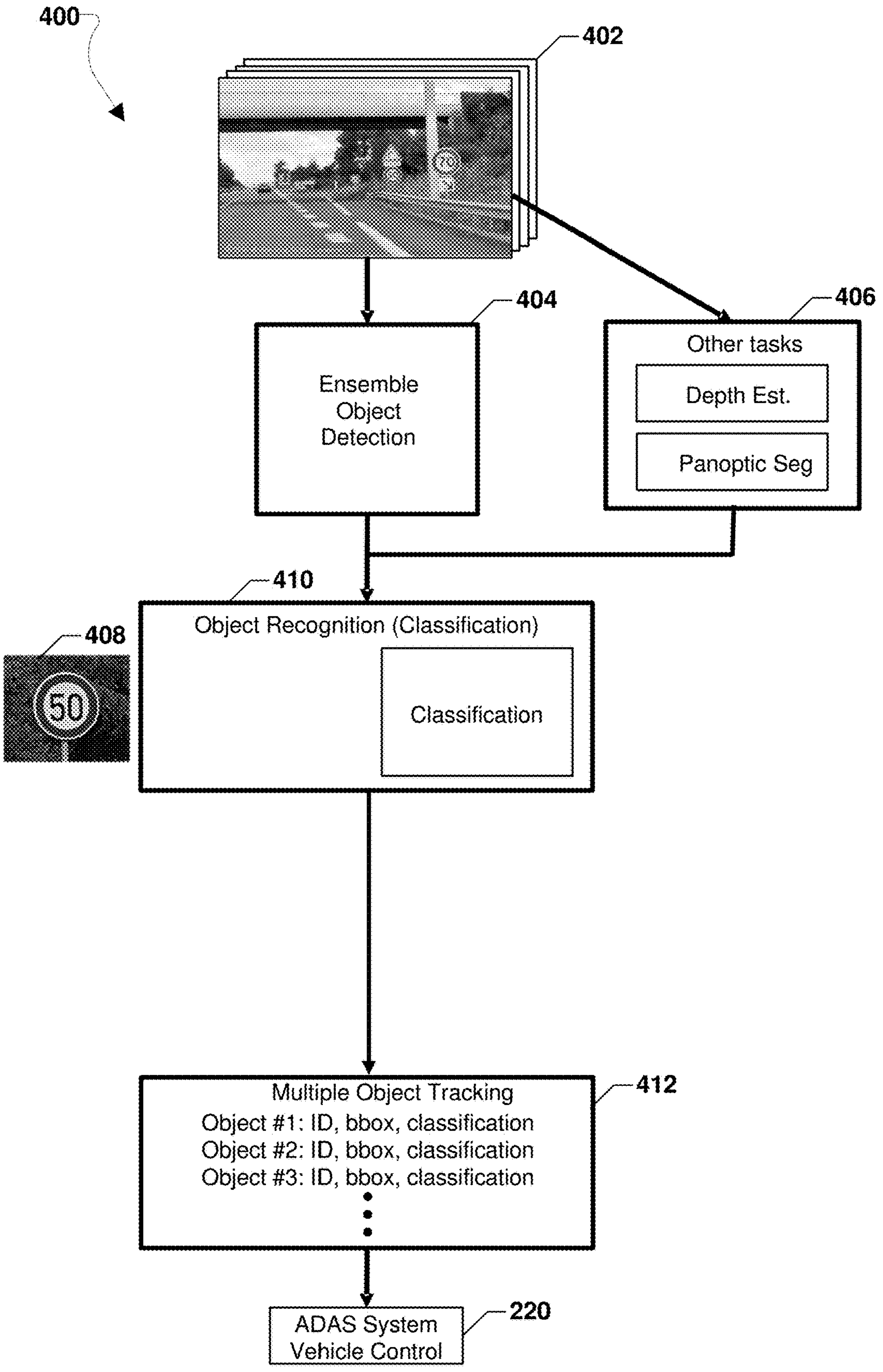
FIGS. 4A and 4B are processing block diagrams illustrating various operations that are performed on a plurality of images as part of conventional autonomous driving systems.

FIG. 4A a processing block diagram 400 illustrating various operations that are performed on camera images from an apparatus camera as part of conventional ADS or ADAS processing. With reference to FIGS. 1A-4A image frames 402 from multiple apparatus cameras may be received by an image processing system, such as a camera perception module 204, which may include multiple modules, processing systems and trained machine model/AI modules configured to perform various operations required to obtain from the images the information necessary to support vehicle navigation and safe operations. While not meaning to be inclusive, FIG. 4A illustrates some of the processing that is involved in supporting autonomous apparatus operations.

Image frames 402 may be processed by an object detection module 404 that performs operations associated with detecting objects within the image frames based on a variety of image processing techniques. As discussed, autonomous vehicle image processing involves multiple detection methods and analysis modules that focus on different aspects of images to provide the information needed by ADS or ADAS systems to navigate safely. The processing of image frames in the object detection module 404 may involve a number of different detectors and modules that process images in different ways in order to recognize objects, define bounding blocks encompassing objects, and identifying locations of detected objects within the frame coordinates. The outputs of various detection methods may be combined in an ensemble detection, which may be a list, table, or data structure of the detections by individual detectors processing image frames. Thus, ensemble detection in the object detection module 404 may bring together outputs of the various detection mechanisms and modules for use in object classification tracking and vehicle control decision-making.

As discussed, image processing supporting autonomous driving systems involves other image processing tasks 406. As an example of other tasks, image frames may be analyzed to determine the 3D depth of roadway features and detected objects. Other processing tasks 406 may include panoptic segmentation, which is a computer vision task that includes both instance segmentation and semantic segmentation. Instance segmentation involves identifying and classifying multiple categories of objects observed within image frames. By solving both instance segmentation and semantic segmentation problems together, panoptic segmentation enables a more detailed understanding by the ADS or ADAS system of a given scene.

The outputs of object detection methods 404 and other tasks 406 may be used in object classification 410. As described, this may involve classifying features and objects that are detected in the image frames using classifications that are important to autonomous driving system decision-making processes (e.g., roadway features, traffic signs, pedestrians, other vehicles, etc.). As illustrated, recognized features, such as a traffic sign 408 in a segment or bounding box within an image frame, may be examined using methods described herein to assign a classification to individual objects as well as obtain information regarding the object or feature (e.g., the speed limit is 50 kilometers per hour per the recognized traffic sign 408).

Outputs of the object classification 410 may be used in tracking 412 various features and objects from one frame to the next. As described above, the tracking of features and objects is important for identifying the trajectory of features/objects relative to the apparatus for purposes of navigation and collision avoidance.

Figure 4B:
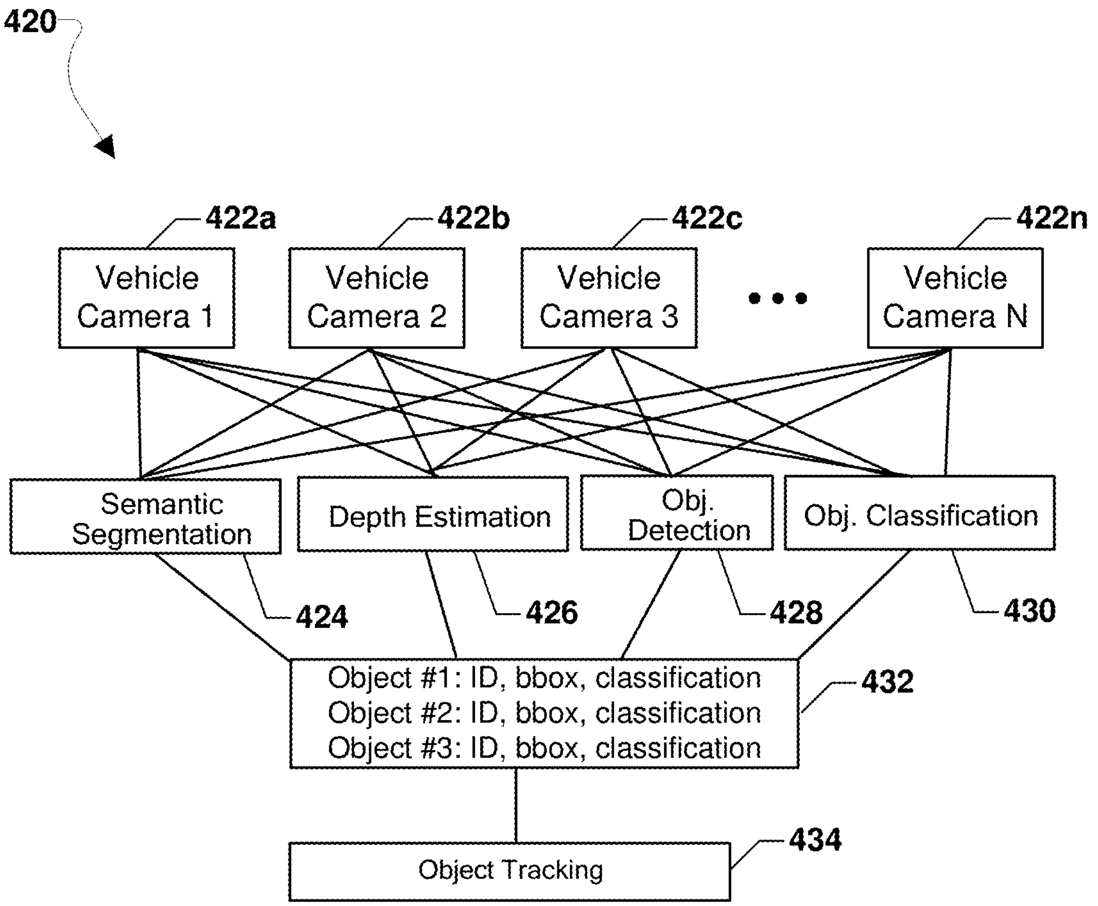

FIG. 4B is a component and data flow diagram 420 illustrating the processing of apparatus camera images for generating the data used for object tracking in support of conventional ADS and ADAS systems. With reference to FIGS. 1A-4B, image data from each camera 422*a*-422*n* of an apparatus may be provided to and processed by a number of neural network AI modules that are trained to perform a specific type of image processing, including semantic segmentation processing, depth estimation, object detection and object classification.

Image data from one or more of the cameras 422*a*-422*n* may be processed by a semantic segmentation module 424 that may be an AI/ML network trained to receive image data as an input and produce an output that associates groups of pixels or masks in the image with a classification label. Semantic segmentation refers to the computational process of partitioning a digital image into multiple segments, masks, or "super-pixels" with each segment identified with or corresponding to a predefined category or class. The objective of semantic segmentation is to assign a label to every pixel or group of pixels (e.g., pixels spanning a mask) in the image so that pixels with the same label share certain characteristics. Non-limiting examples of classification labels include "trees," "traffic sign," "pedestrian," "roadway," "building," "car," "sky," etc. Coordinates of the labeled masks within a digital image may be defined by coordinates (e.g., pixel coordinates) within the image or coordinates and the area of each mask within the image.

The AI/ML semantic segmentation module 424 may employ an encoder-decoder architecture in which the encoder part performs feature extraction, while the decoder performs pixel-wise classification. The encoder part may include a series of convolutional layers followed by pooling layers, reducing the spatial dimensions while increasing the depth. The decoder reverses this process through a series of upsampling and deconvolutional layers, restoring the spatial dimensions while applying the learned features to individual pixels for segmentation. Using such processes, the semantic segmentation module 424 in an apparatus like a vehicle may enable real-time detection of pedestrians, road signs, and other vehicles.

Image data from one or more of the cameras 422*a*-422*n* may be processed by a depth estimate module 426 that is trained to receive image data as an input and produce an output that estimates the distance from the camera or apparatus to objects associated with each pixel or groups of pixels. A variety of methods may be used by the depth estimate module 426 to estimate the distance or depth of each pixel. A nonlimiting example of such methods includes models that use dense vision transformers trained on a data set to enable monocular depth estimation to individual pixels and groups of pixels, as described in "Computer Vision and Pattern Recognition (cs.CV)" by R. Ranftl, et. al., arXiv: 2103.13413 [cs.CV]. Another nonlimiting example of such methods uses a hierarchical transformer encoder to capture and convey the global context of an image, and a lightweight decoder to generate an estimated depth map while considering local connectivity, as described in "Global-Local Path Networks for Monocular Depth Estimation with Vertical Cut Depth" by D. Kim et. al, arXiv:2201.07436v3 [cs.CV]. Additionally, stereoscopic depth estimate methods based on parallax may also be used to estimate depths to objects associated with pixels in two (or more) images separated by a known distance, such as two images taken approximately simultaneously by two spaced apart cameras, or two images taken by one camera at different instances on a moving apparatus.

Image data from one or more of the cameras 422*a*-422*n* may be processed by an object detection module 428 that may be an AI/ML network trained to receive image data as an input and produce an output that identifies individual objects within the image, including defining pixel coordinates of a bounding box around each detected object. As an example, an object detection module 428 may include neural network layers that are configured and trained to divide a digital image into regions or a grid, pass pixel data within each region or grid through a convolutional network to extract features, and then process the extracted features through layers that are trained to classify objects and define bounding box coordinates. Known methods of training an object detection module neural network may use an extensive training dataset of images (e.g., image gathered by cameras on vehicles traveling many driving routes) that include a variety of objects likely to be encountered annotated with ground truth information including appropriate labels for each object in the images, with appropriate labels manually identified for each object in each training image.

Image data from one or more of the cameras 422$a$-422$n$ may be processed by an object classification module 430 that may be an AI/ML network trained to receive image data as an input and produce an output that classifies objects in the image. Object classification involves the categorization of detected objects into predefined classes or labels, which may be performed after object detection and is essential for decision-making, path planning, and event prediction within an autonomous navigation framework. Known methods of training an object classification module for ADS or ADAS applications may use an extensive training database of images that include a variety of objects with ground truth information on the classification appropriate for each object.

As illustrated, outputs of the image processing modules 424-430 may be combined to generate a data structure 432 that includes for each object identified in an image an object tracking number or identifier, a bounding box (i.e., pixel coordinates defining a box that encompasses the object), and a classification of the object. This data structure may then be used for object tracking 434 in support of ADS or ADAS navigation, path planning, and collision avoidance processing.

While the processing described with reference to FIGS. 4A and 4B can provide sufficient information regarding the scene surrounding an apparatus to enable autonomous maneuvering, the results may be vulnerable to vision attacks that may spoof or confuse one or more of the image processing modules 424-430. To overcome this vulnerability, various embodiments included consistency checks that are configured to identify inconsistencies in the outputs of the image processing modules 424-430 that may be used to identify an actual or likely vision attack.

Figure 5A:
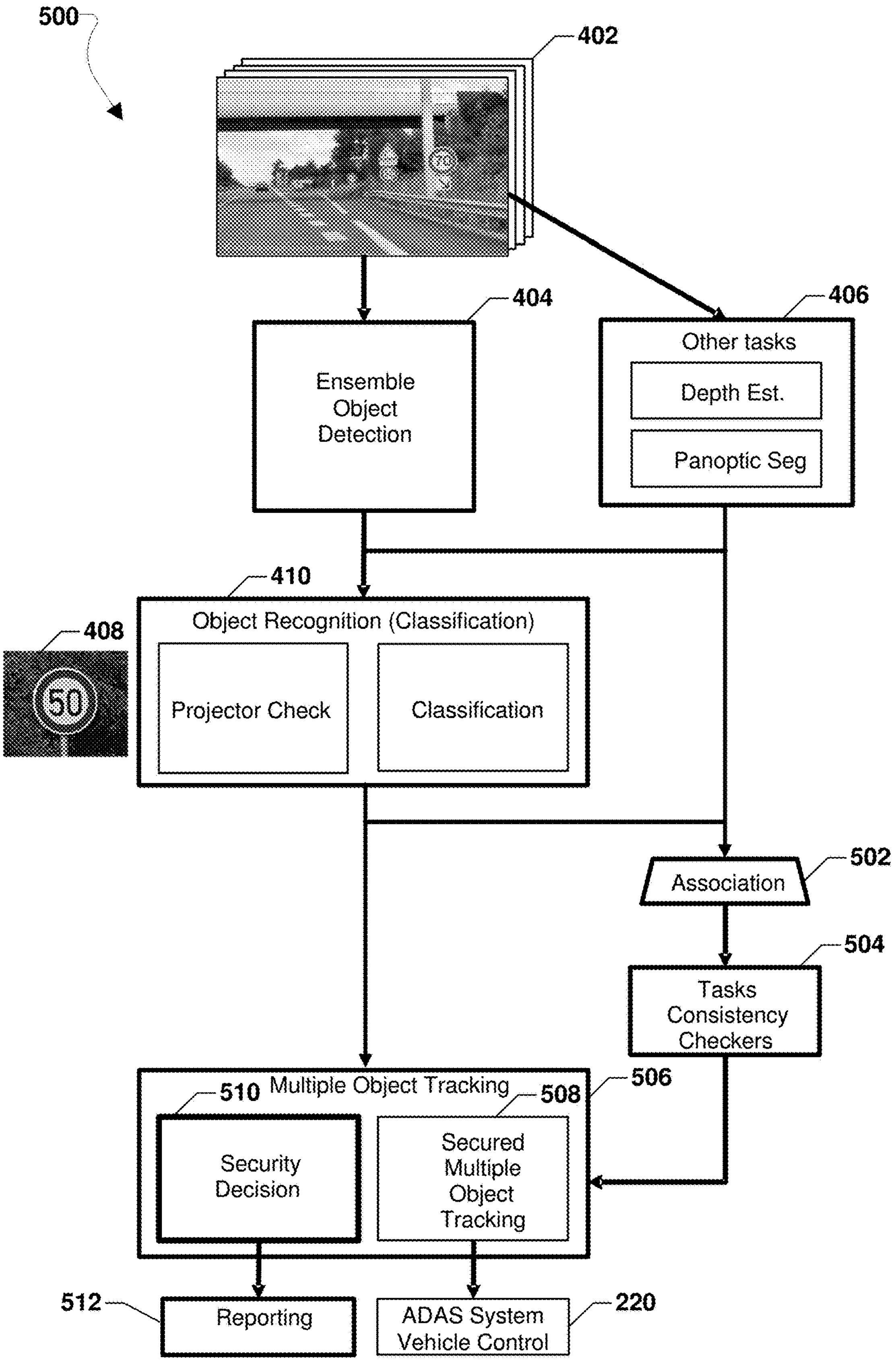
FIGS. 5A and 5B are processing block diagrams illustrating various operations that are performed on a plurality of images that may be performed as part of autonomous driving systems part including operations to identify inconsistencies in image processing results that may be indicative of vision attacks on a camera of an apparatus in accordance with various embodiments.

FIG. 5A a processing block diagram 500 illustrating various operations that are performed on camera images from an apparatus camera as part of conventional ADS or ADAS processing. With reference to FIGS. 1A-5A image frames 402 from multiple apparatus cameras may be received by an image processing system, such as a camera perception module 204, which may include multiple modules, processing systems and trained machine model/AI modules configured to perform various operations required to obtain from the images the information necessary to support vehicle navigation and safe operations. While not meaning to be inclusive, FIG. 5A illustrates some of the processing that is involved in supporting autonomous apparatus operations as well as recognizing vision attacks and taking mitigating actions according to various embodiments.

Image frames 402 may be processed by an object detection module 404 that performs operations associated with detecting objects within the image frames based on a variety of image processing techniques. As discussed, autonomous vehicle image processing involves multiple detection methods and analysis modules that focus on different aspects of using image streams to provide the information needed by autonomous driving systems to navigate safely. The processing of image frames in the object detection module 404 may involve a number of different detectors and modules that process images in different ways in order to recognize objects, define bounding blocks encompassing objects, and identifying locations of detected objects within the frame coordinates. The outputs of various detection methods may be combined in an ensemble detection, which may be a list, table, or data structure of the detections by individual detectors processing image frames. Thus, ensemble detection in the object detection module 404 may bring together outputs of the various detection mechanisms and modules for use in object classification tracking and vehicle control decision-making.

As discussed, image processing supporting autonomous driving systems involve other image processing tasks 406. As an example of other tasks, image frames may be analyzed to determine the 3D depth of roadway features and detected objects. Other processing tasks 406 may include panoptic segmentation, which is a computer vision task that includes both instance segmentation and semantic segmentation. Instance segmentation involves identifying and classifying multiple categories of objects observed within image frames. By solving both instance segmentation and semantic segmentation problems together, panoptic segmentation enables a more detailed understanding by the autonomous driving system of a given scene.

The outputs of object detection methods 404 and other tasks 406 may be used in object classification 410. As described, this may involve classifying features and objects that are detected in the image frames using classifications that are important to autonomous driving system decision-making processes (e.g., roadway features, traffic signs, pedestrians, other vehicles, etc.). As illustrated, recognized features, such as a traffic sign 408 in a segment or bounding box within an image frame, may be examined using methods described herein to assign a classification to individual objects as well as obtain information regarding the object or feature (e.g., the speed limit is 50 kilometers per hour per the recognized traffic sign 408). Also, as part of object classification 410, checks may be made of image frames to look for projection attacks using techniques described herein.

Outputs of the ensemble object detection 404 and other processing tasks 406 may also be associated in operation 502 so that the outputs of selected processing tasks may be compared in task consistency checks 504. As described further herein, task consistency checks 504 may be configured to recognize inconsistencies in the output of two or more different image processing methods performed on an image that could be indicative of a camera or vision attack. Consistency checkers 504 may also be referred to or function as sensors, detectors or configured to recognize inconsistencies between outputs of two or more different types of image processing involved in ADS and ADAS systems that rely on cameras for navigation and object avoidance.

Outputs of the object classification 410 may be combined with indications of inconsistencies identified by the consistency checkers 504 to include indications of inconsistencies in the object tracking data in multiple object tracking operations 506. As described above, the tracking of features and objects is important for identifying the trajectory of features/objects relative to the vehicle for purposes of navigation and collision avoidance. Using the output of the consistency checker 404, the multiple tracking operations 506 provide secured multiple object tracking 508 to support the vehicle control function 220 of an autonomous driving system. Additionally, feature/object tracking may be used in a security decision module 510 configured to detect inconsistencies that may be indicative or suggestive of a vision attack. Such security decisions may be used for reporting 512 conclusions to a remote service.

Figure 5B:
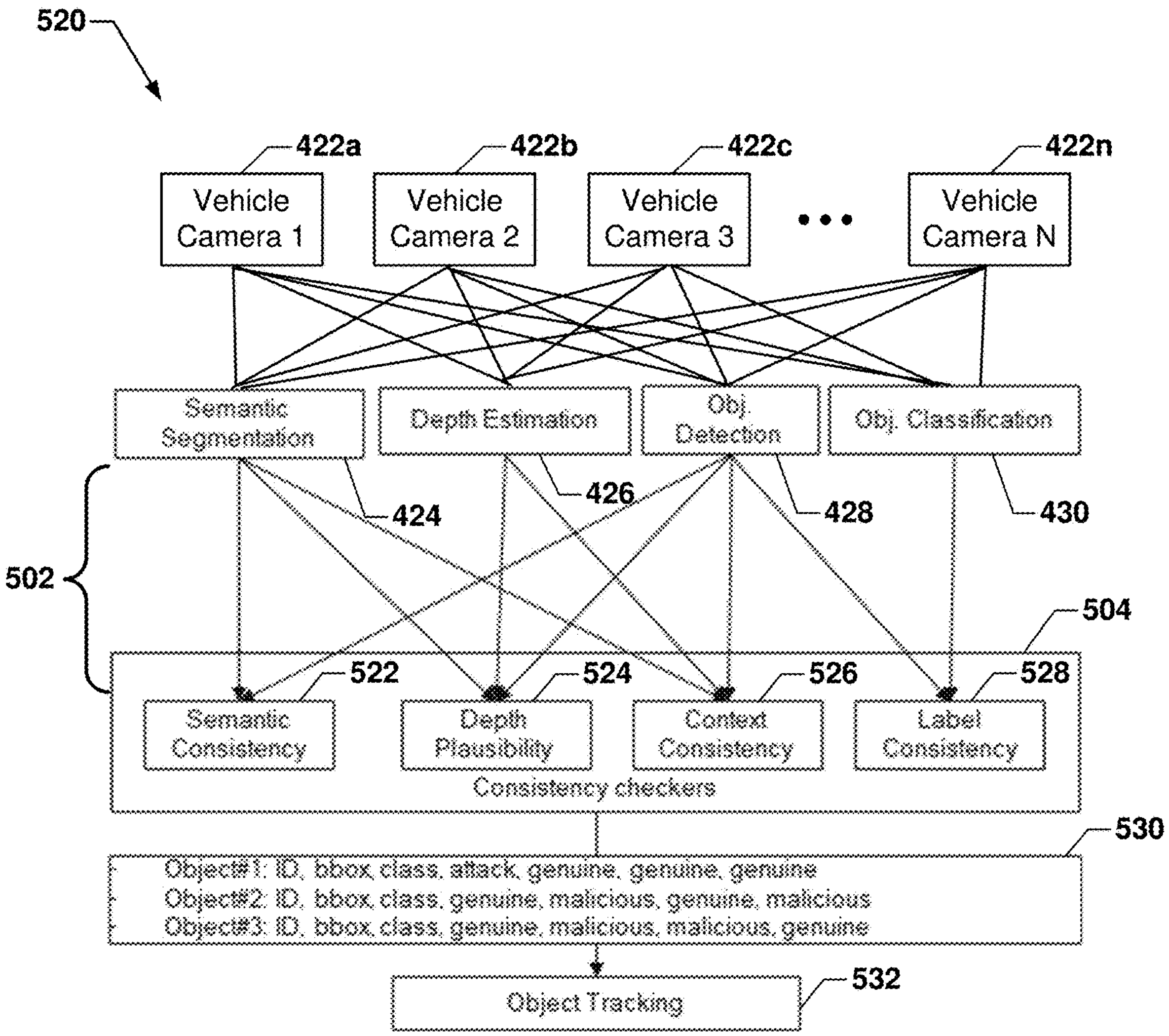

FIG. 5B is a component and data flow diagram 520 illustrating processing of apparatus camera images and consistency checks across the processes for generating the data used for object tracking in accordance with various embodiments. With reference to FIGS. 1A-5B, image data from each camera 422*a*-422*n* of an apparatus may be provided to and processed by a number of neural network AI modules that are trained to perform a specific type of image processing, including semantic segmentation processing, depth estimation, object detection and object classification.

As described with reference to FIG. 4B, image data from one or more of the cameras 422*a*-422*n* may be processed by multiple image processing modules 424-430. As described, the image processing modules 424-430 may by AI/ML modules that include: a semantic segmentation module 424 trained to associate groups of pixels or masks in the image with a classification label; a depth estimate module 426 that estimates the depth of each pixel or groups of pixels; an object detection module 428 that identifies individual objects within bounding boxes within the image; and an object classification module 430 that classifies objects in the image.

In various embodiments, the outputs of the image processing modules 424-430 are checked for inconsistencies among different module outputs that may indicate or evidence a vision attack. As illustrated, outputs of selected processing modules may be associated 502 with particular consistency checkers 504. For example, outputs of a semantic segmentation module 424 and an object detection module 428 may be provided to a semantic consistency checker 522, outputs of the semantic segmentation module 424, a depth estimation module 426, and the object detection module 428 may be provided to a depth plausibility checker 524, outputs of the semantic segmentation module 424, the depth estimation module 426, and the object detection module 428 may be provided to a context consistency checker 526, and outputs of the object detection module 428 and an object classification module may be provided to a label consistency checker 524.

As described, the semantic consistency checker 522 may compare outputs of semantic segmentation processing of an image may be compared to bounding boxes around detected objects from object detection processing to determine whether labels assigned to semantic segmentation masks are consistent or inconsistent with detected object bounding boxes. In some embodiments, a mask label from semantic segmentation that differs from or does not encompass the label assigned in object detection/object classification processing may be recognized as an inconsistency. In some embodiments, if the labels match, the locations in the image of corresponding segmentation masks and detected object bounding box may be compared, and an inconsistency recognized if the mask and bounding box locations do not overlap within a threshold percentage. If either inconsistency is recognized, an appropriate indication of the inconsistency (e.g., a "1" or location of the inconsistent labels) may be output for use in tracking objects.

As described, the depth plausibility checker 524 may compare distributions of depth estimates of individual pixels or masks of pixels from semantic segmentation to depth estimations of pixels across a detected object to determine whether the two depth distributions in are consistent or inconsistent. In some embodiments, if the distributions of depth estimates of pixels spanning a segmentation mask differ by more than a threshold amount from the distributions of depth estimates of pixels spanning an object within the mask, a depth inconsistency may be recognized, and an appropriate indication of the inconsistency (e.g., a "1" or location of the inconsistent labels) may be output for use in tracking objects.

As described, the context consistency checker 526, the depth estimations of detected objects and depth estimation of the rest of the environment in the scene may be checked for inconsistencies indicative of a false image or spoofed object. In some embodiments, the checker or detector may compare the estimated depth values of pixels of a detected object or a mask encompassing the object to estimated depth values of pixels of an overlapping mask. In some embodiments, the checker or detector may compare the distribution of estimated pixel depth values spanning a detected object or bounding box encompassing the object to distribution of estimated pixel depth values spanning an overlapping mask, comparing differences to a threshold indicative of an actual or potential vision attack or otherwise actionable inconsistency. If an inconsistency is recognized, an appropriate indication of the inconsistency (e.g., a "1" or location of the inconsistent labels) may be output for use in tracking objects.

As described, the label consistency checker 528 may compare labels assigned to detected objects from object detection processing to labels of the same object or region (within a mask) obtained from object classification processing to determine whether the object classification label is consistent with the detect object. If the labels assigned to the same object or mask by the two labeling processes (semantic segmentation and object detection/classification) do not match or are in different distinct categories, a label inconsistency may be recognized, and an appropriate indication of the inconsistency (e.g., a "1" or location of the inconsistent labels) may be output for use in tracking objects.

The outputs of the consistency checkers 522-528 in the form of an indication of an attack (or potential attack) or genuine data (e.g., in one bit flags) may be combined with or appended to outputs of the image processing modules 424-430 to generate a data structure 530 that includes for each object identified in an image an object tracking number or identifier, a bounding box (i.e., pixel coordinates defining a box that encompasses the object), a classification of the object, and indications of the different consistency or inconsistency results of the consistency checkers 522-528. As an illustrative example, Object #1 includes indications (e.g., a 1 or 0) indicating that the semantic consistency check identified an inconsistency that could indicate an attack while the other consistency checkers did not find inconsistencies. This data structure 530 may then be use for object tracking 532 in support of ADS or ADAS navigation, path planning, and collision avoidance processing with the improvement that the object data includes information related to indications of potential attacks identified by the inconsistency checkers 522-528.

Figure 6:
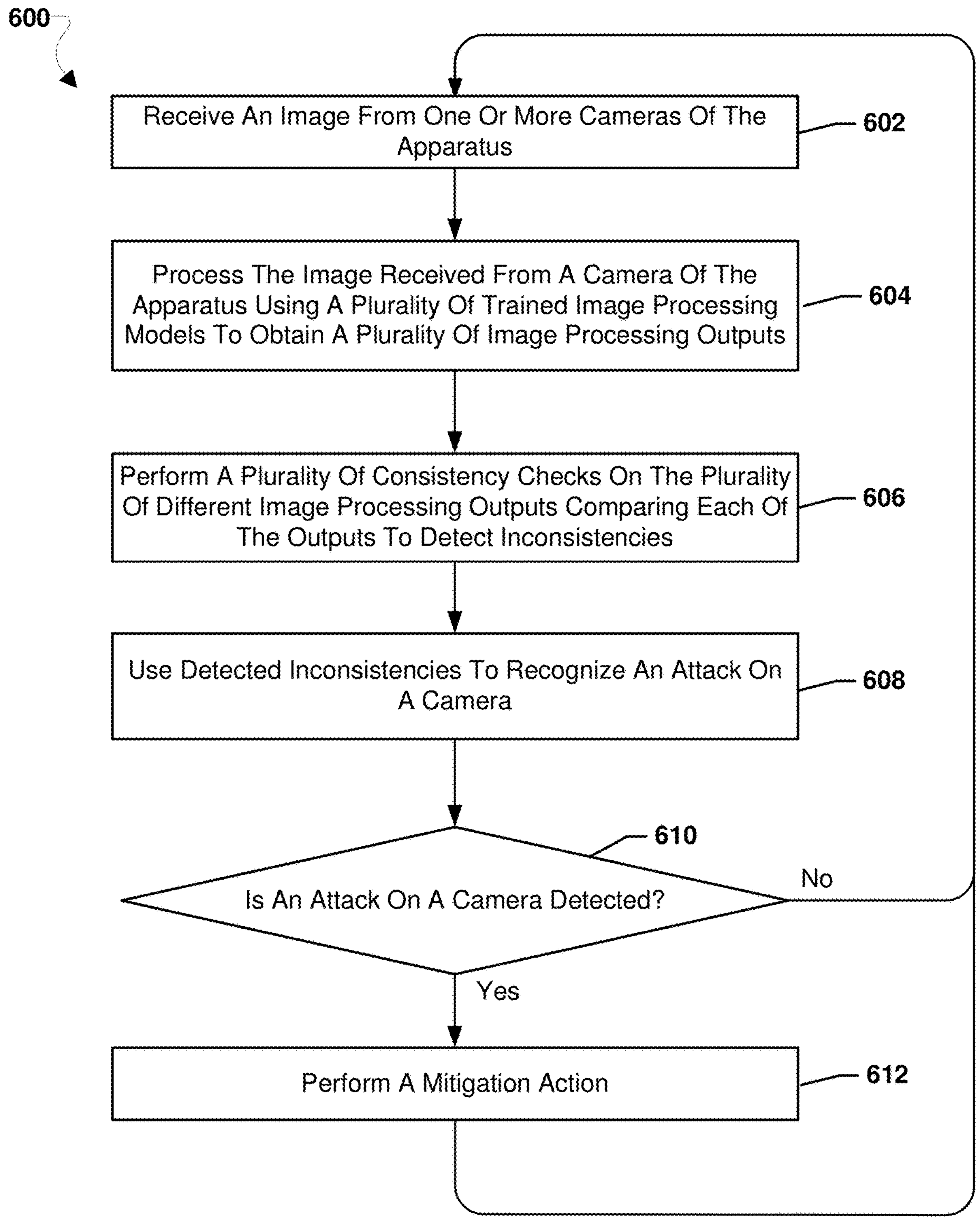
FIG. 6 is a process flow diagram of an example method for detecting vision attacks performed by a processing system on an apparatus (e.g., a vehicle) for detecting and reacting to potential attacks on apparatus camera systems in accordance with various embodiments.

FIG. 6 is a process flow diagram of an example method 600 for detecting vision attacks performed by a processing system on an apparatus (e.g., a vehicle) for detecting and reacting to potential attacks on apparatus camera systems in accordance with various embodiments. With reference to FIGS. 1A-6, the operations of the method 600 may be performed by a processing system (e.g., 102, 120, 240) including one or more processors (e.g., 110, 123, 124, 126, 127, 128, 130) and/or hardware elements, any one or combination of which may be configured to perform any of the operations of the method 600. Further, one or more processors within the processing system may be configured with software or firmware to perform various operations of the method. To encompass any of the processor(s), hardware elements and software elements that may be involved in performing the method 600, the elements performing method operations are referred to as a "processing system."

Further, means for performing functions of the method 600 may include the processing system (e.g., 102, 120, 240) including one or more processors (e.g., 110, 123, 124, 126, 127, 128, 130), memory 112, a radio module 118, and one or more cameras (e.g., 122, 136).

In block 602, the processing system may perform operations including receiving an image (such as but not limited to an image from stream of camera image frames) from one or more cameras of the apparatus (e.g., a vehicle). For example, an image may be received from a forward-facing camera used by an ADS or ADAS for observing the road ahead for navigation and collision avoidance purposes.

In block 604, the processing system may perform operations including processing an image received from a camera of the apparatus to obtain a plurality of image processing outputs. In some embodiments, the image processing may be performed by a plurality of neural network processors that have been trained using machine learning methods (referred to herein as "trained image processing models") to receive images as input and generate outputs that provide the type of processed information required by apparatus systems (e.g., ADS or ADAS systems). In some embodiments, the operations performed in block 604 may include processing an image received from the camera of the apparatus using a plurality of different trained image processing models to obtain a plurality of different image processing outputs. As described, camera images may be processed by a number of different processing systems, including trained neural network processing systems to extract information that is necessary to safely navigate the apparatus. As described in more detail with reference to FIG. 7, these operations may include semantic segmentation processing, depth estimation processing, object detection processing, and/or object classification processing.

In block 606, the processing system may perform operations including performing a plurality of consistency checks on the plurality of image processing outputs, in which each of the plurality of consistency checks compares each of the plurality of outputs to detect an inconsistency. In some embodiments, the operations performed in block 606 may include performing a plurality of consistency checks on the plurality of different image processing outputs, in which each of the plurality of consistency checks compares two or more selected outputs of the plurality of different outputs to detect inconsistencies. As described in more detail with reference to FIGS. 8A-8D, the plurality of consistency checks may include semantic consistency checks comparing classification labels associated with masks from semantic segmentation processing with bounding boxes of object detections in the image from object detection processing, location consistency check comparing locations within the image of classification masks from semantic segmentation processing with locations within the image of bounding boxes of object detections in the images from object detection processing, depth plausibility checks comparing depth estimations of detected objects from object detection processing with depth estimates of individual pixels or groups of pixels from depth estimation processing, and context consistency check comparing depth estimations of a bounding box encompassing a detected object from object detection processing with depth estimations of a mask encompassing the detected object from semantic segmentation processing.

In block 608, the processing system may perform operations including using detected inconsistencies to recognize an attack on a camera of the apparatus. In some embodiments, the processing system may recognize an attack on one or more cameras of the apparatus in response to detecting one or a threshold number of inconsistencies in an image. In some embodiments, the result of the various consistency checks performed in block 606 may be used in a decision algorithm to recognize whether an attack on vehicle cameras is happening or likely. Such decision algorithms may be as simple as a recognizing a vision attack if any one of the different inconsistency check processes indicates the potential for contact. More sophisticated algorithms may include assigning a weight to each of the various inconsistency checks and accumulating the result in a voting or threshold algorithm to decide whether a vision attack is more likely than not.

In determination block 610, the processing system may detect an attack based on the inconsistency in image processing as performed in block 606.

In response to detecting a vision attack (or determining that a vision attack is likely) (i.e., determination block 610="Yes"), the processing system may perform a mitigation action in block 612. In some embodiments, the mitigation action may include adding indications of inconsistencies from each of the plurality of consistency checks to information regarding each detected object that provided is to an autonomous driving system for tracking detected objects. Adding the indications of inconsistencies in object tracking information may enable an apparatus (e.g., a vehicle) ADS or ADAS to recognize and compensate for vision attacks, such as ignoring or deemphasizing information from a camera that is being attacked. In some embodiments, the mitigation action may include reporting the detected attack to a remote system, such as a law-enforcement authority or highway maintenance organization so that the threat or cause of the malicious attack can be stopped or removed. In some embodiments, the mitigation action may include outputting an indication of the vision attack, such as a warning or notification to an operator. In some embodiments, the processing system may perform more than one mitigation action.

The operations of the method 600 may be performed continuously. Thus, in response to not detecting an attack (i.e., determination block 610="No") and/or after taking a mitigation action in block 612, the processing system may repeat the method 600 by again receiving another image from an apparatus camera in block 602 and performing the method as described.

Figure 7:
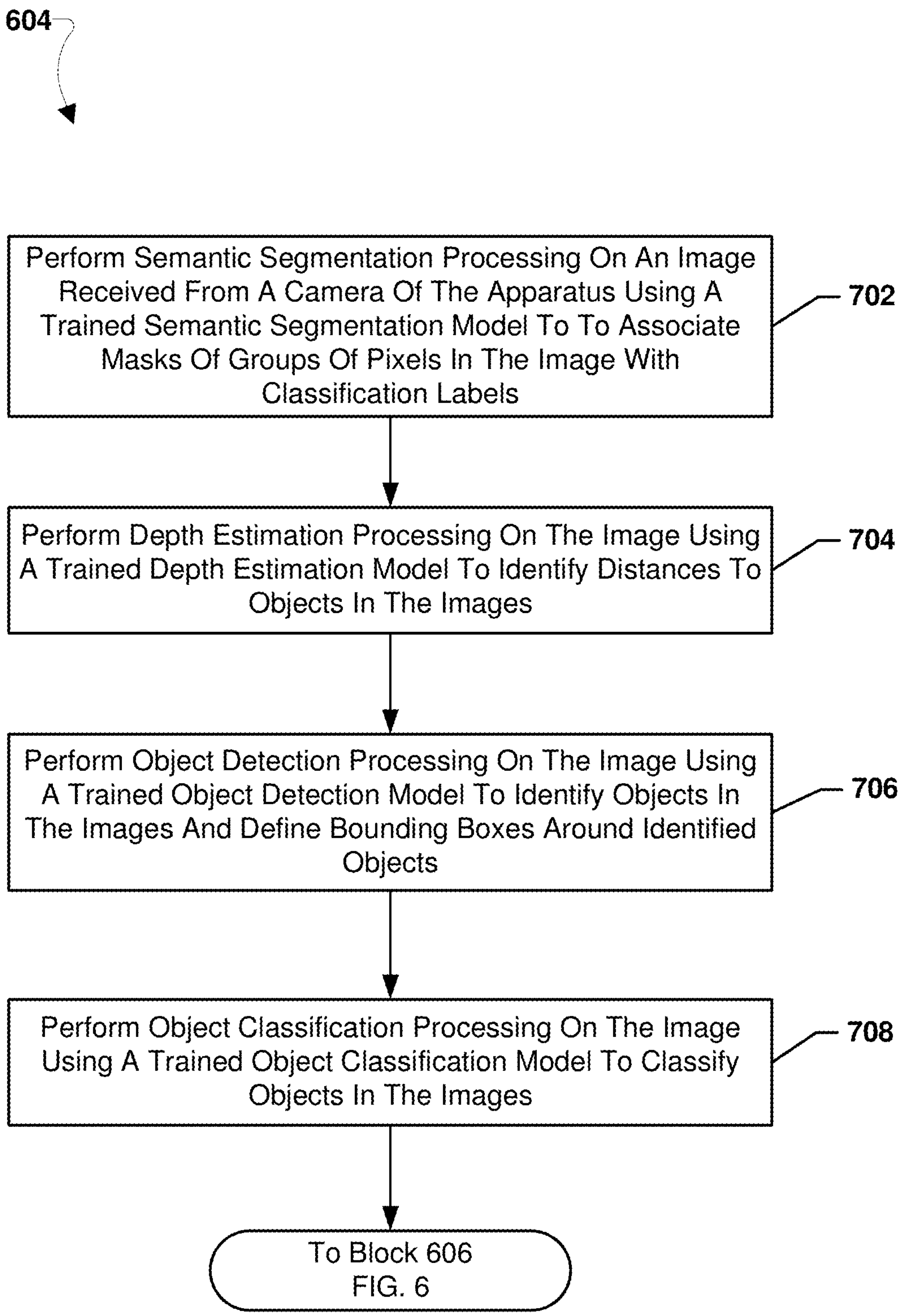
FIG. 7 is a process flow diagram of methods of image processing that may be performed on an image from a camera of an apparatus to support an ADS or ADAS the output of which may be processed to recognize inconsistencies that may indicate a vision attack or potential vision attack in accordance with some embodiments.

FIG. 7 is a process flow diagram of methods of image processing that may be performed on an image from a camera of an apparatus to support an ADS or ADAS the output of which may be processed to recognize inconsistencies that may indicate a vision attack or potential vision attack in accordance with some embodiments. Specifically, FIG. 7 illustrates operations that may be performed in block 604 of the method 600 in processing an image received from a camera of the apparatus in accordance with various embodiments. With reference to FIGS. 1A-7, the operations 604 may be performed by a processing system (e.g., 102, 120, 240) including one or more processors (e.g., 110, 123, 124, 126, 127, 128, 130) and/or hardware elements, any one or combination of which may be configured to perform any of the operations. Further, one or more processors within the processing system may be configured with software or firmware to perform various operations. To encompass any of the processor(s), hardware elements and software elements that may be involved in performing the illustrated operations, the elements performing method operations are referred to as a "processing system." Further, means for performing functions of the illustrated operations may include the processing system (e.g., 102, 120, 240) including one or more processors (e.g., 110, 123, 124, 126, 127, 128, 130), memory 112, and/or vehicle cameras (e.g., 122, 136).

After receiving an image from a camera of the apparatus (e.g., an image frame in a stream of images from cameras), the processing system may perform operations including performing semantic segmentation processing on the image using a trained semantic segmentation model to associate masks of groups of pixels in the image with classification labels in block 702. Semantic segmentation processing may include processing by an AI/ML network trained to receive image data as an input and produce an output that associates groups of pixels or masks in the image with a classification label. Semantic segmentation may include partitioning the image into multiple masks, with each mask assigned a predefined category or class.

In block 704, the processing system may perform operations including performing depth estimation processing on the image using a trained AI/ML depth estimation model to identify distances to pixels encompassing detected objects in the image. The depth estimations made in block 704 may generate a map of pixel depth estimations across some or all of the image. As described above, depth estimation processing may use AI/ML depth estimation models based on monocular depth estimation, or a hierarchical transformer encoder to capture and convey the global context of an image, and a lightweight decoder to generate an estimated depth map. Pixel depth estimations may also or alternatively use stereoscopic depth estimate methods based on parallax in space and/or time.

In block 706, the processing system may perform operations including performing object detection processing on the image using an AI/ML network object detection model trained to identify objects in images and define bounding boxes around identified objects. In some embodiments, object detection processing may include processing by neural network layers that are configured and trained to divide a digital image into regions or a grid, pass pixel data within each region or grid through a convolutional network to extract features, and then process the extracted features through layers that are trained to classify objects and define bounding box coordinates. The output of block 706 may be a number of bounding boxes enclosing detected objects within each image.

In block 708, the processing system may perform operations including performing object classification processing on the image using an AI/ML network object classification model trained to classify objects in the image. In some embodiments, object classification processing may include categorization of detected objects into predefined classes or labels.

FIGS. 8A-8D process flow diagrams of methods of recognizing inconsistencies in the processing of an image from a camera of an apparatus for recognizing a vision attack or potential vision attack in accordance with some embodiments. Specifically, FIGS. 8A-8D illustrate example methods 800*a*-800*d* that may be performed in block 606 of the method 600 to identify inconsistencies among the results of image processing operations in block 604 of the method 600 as described with reference to blocks 702-708 illustrated in FIG. 7. The order in which FIGS. 8A-8D are presented and methods 800*a*-800*d* are described is arbitrary and the processing system may perform the methods 800*a*-800*d* in any order and may perform fewer than all of the methods in some embodiments. With reference to FIGS. 1A-8D, the operations in the methods 800*a*-800*d* may be performed by a processing system (e.g., 102, 120, 240) including one or more processors (e.g., 110, 123, 124, 126, 127, 128, 130) and/or hardware elements, any one or combination of which may be configured to perform any of the operations. Further, one or more processors within the processing system may be configured with software or firmware to perform various operations. To encompass any of the processor(s), hardware elements and software elements that may be involved in performing the illustrated operations, the elements performing method operations are referred to as a "processing system." Further, means for performing functions of the illustrated operations may include the processing system (e.g., 102, 120, 240) including one or more processors (e.g., 110, 123, 124, 126, 127, 128, 130), memory 112, and/or vehicle cameras (e.g., 122, 136).

Figure 8A:
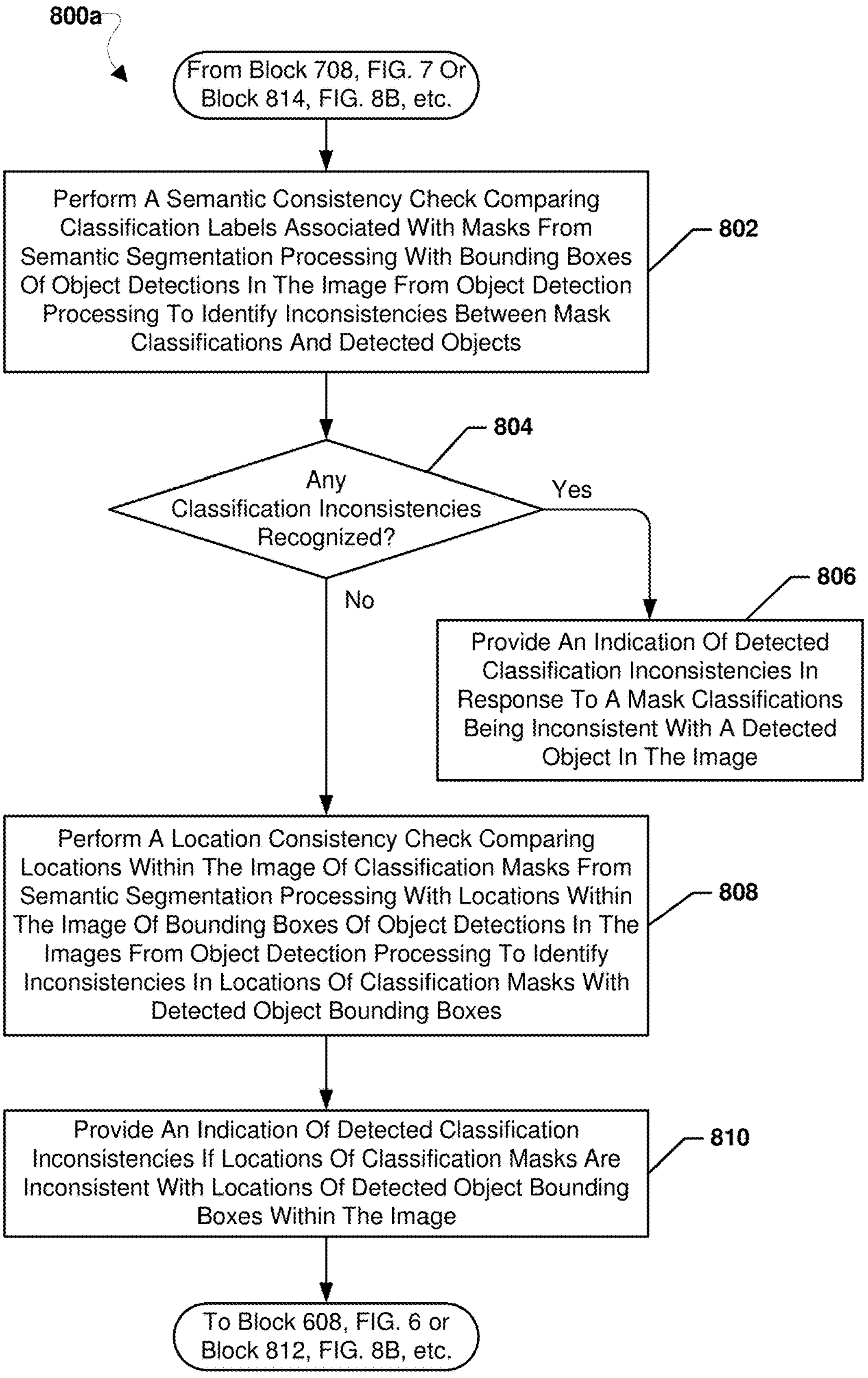
FIGS. 8A-8D are process flow diagrams of methods of recognizing inconsistencies in the processing of an image from a camera of an apparatus for recognizing a vision attack or potential vision attack in accordance with some embodiments.

Referring to FIG. 8A, in block 802 of the method 800*a*, the processing system may perform operations including a semantic consistency check comparing classification labels associated with masks from semantic segmentation processing with bounding boxes of object detections in the image from object detection processing to identify inconsistencies between mask classifications and detected objects. As described herein, a semantic consistency check may include the processing system comparing the outputs of semantic segmentation processing of an image to bounding boxes around objects detected in object detection processing to determine whether labels assigned to semantic segmentation masks are consistent or inconsistent with detected object bounding boxes.

In block 804, the processing system may determine whether any classification inconsistencies in the image were recognized in the semantic segmentation processing of the image and object detection processing of the image.

In response to determining that one or more classification inconsistencies in the image were recognized (i.e., determination block 804="Yes"), the processing system may perform operations including providing an indication of detected classification inconsistencies in response to a mask classification being inconsistent with a detected object in the image in block 806. In some embodiments, this indication may be information provided to a decision process configured to determine whether a vision attack on a camera is detected or likely based on one more recognized inconsistencies. In some embodiments, this indication may be information that may be included with or appending to object tracking information as described herein. In some embodiments, this indication may be information that may be included in or used to generate a report of an image attack for submission to a remote server as described herein. In some embodiments, this indication may be another signal, information or response that enables an apparatus ADS or ADAS to respond to or accommodate the recognized inconsistency.

In response to determining that no classification inconsistencies in the image processing were recognized (i.e., determination block 804="No"), the processing system may perform operations including performing a location consistency check comparing locations within the image of classification masks from semantic segmentation processing with locations within the image of bounding boxes of object detections in the images from object detection processing to identify inconsistencies in locations of classification masks with detected object bounding boxes in block 808.

In block 810, the processing system may perform operations including providing an indication of detected classification inconsistencies if locations of classification masks are inconsistent with locations of detected object bounding boxes within the image. As described, this indication may be information provided to a decision process, information that may be included with or appending to object tracking information, information that may be included in or used to generate to a remote server, and/or another signal, information or response that enables an apparatus ADS or ADAS to respond to or accommodate the recognized inconsistency.

Thereafter, the processing system may perform the operations of block 606 of the method 600, as described, and/or other operations to check for inconsistencies in image processing such as performing operations in the methods **800*b* (FIG. 8B), 800*c* (FIG. 8C), and/or 800*d* (FIG. 8**D).

Figure 8B:
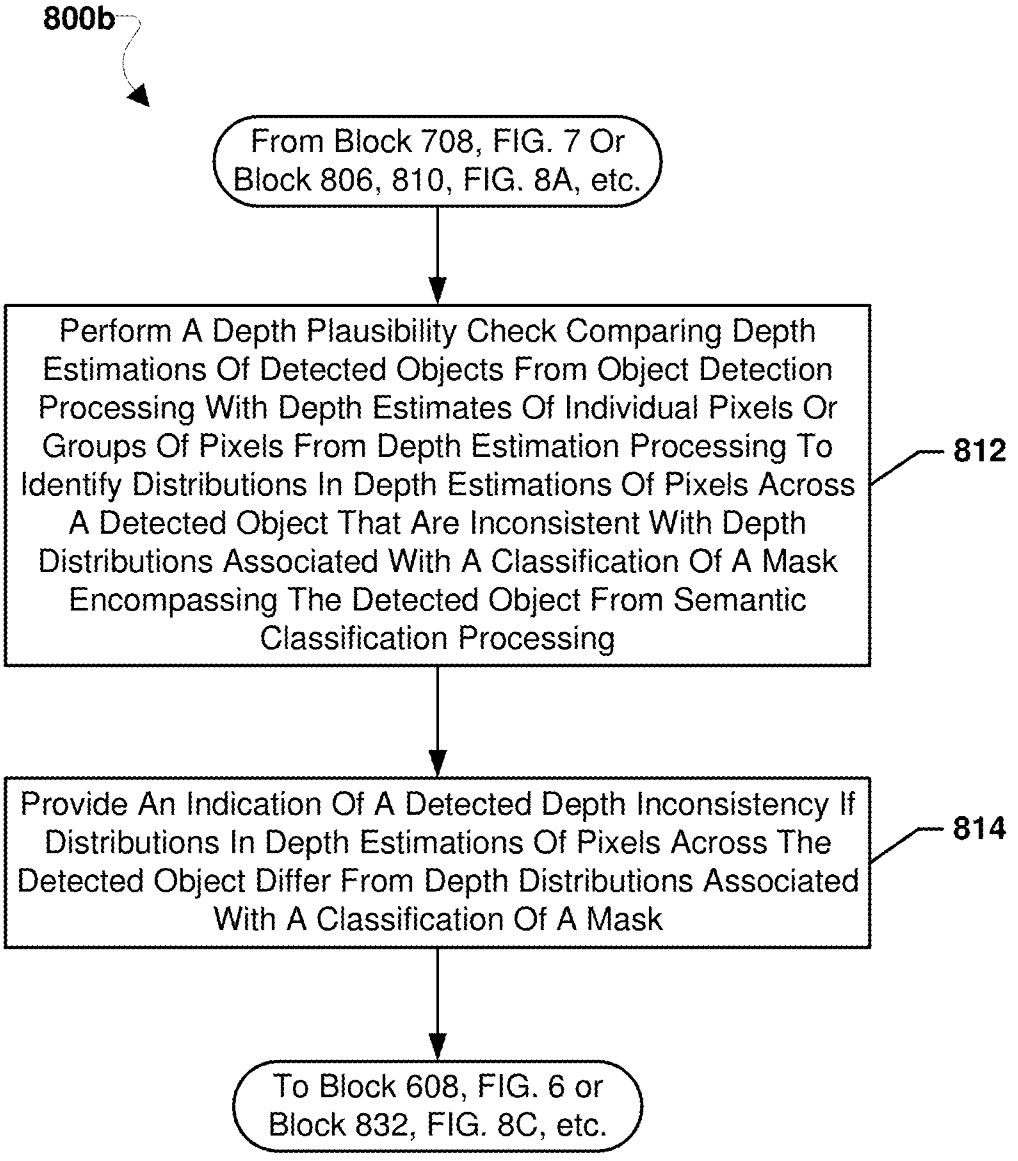

Referring to FIG. 8B, in block 812 of the method **800*b***, the processing system may perform operations including depth plausibility checks comparing depth estimations of detected objects from object detection processing with depth estimates of individual pixels or groups of pixels from depth estimation processing to identify distributions in depth estimations of pixels across a detected object that are inconsistent with depth distributions associated with a classification of a mask encompassing the detected object from semantic classification processing. As described herein, depth plausibility checks may include recognizing depth or distance estimates to pixels or groups of pixels within classification masks and/or detected objects are inconsistent with depth or distance estimates of the classification masks and/or detected objects as a whole within the image.

In block 814, the processing system may perform operations including providing an indication of detected depth plausibility checks if depth or distance estimates to pixels or groups of pixels within classification masks and/or detected objects are inconsistent with depth or distance estimates of the classification masks and/or detected objects as a whole within the image. As described, this indication may be information provided to a decision process, information that may be included with or appending to object tracking information, information that may be included in or used to generate to a remote server, and/or another signal, information or response that enables an apparatus ADS or ADAS to respond to or accommodate the recognized inconsistency.

Thereafter, the processing system may perform the operations of block 606 of the method 600, as described, and/or other operations to check for inconsistencies in image processing such as performing operations in the methods **800*a* (FIG. 8A), 800*c* (FIG. 8C), and/or 800*d* (FIG. 8**D).

Figure 8C:
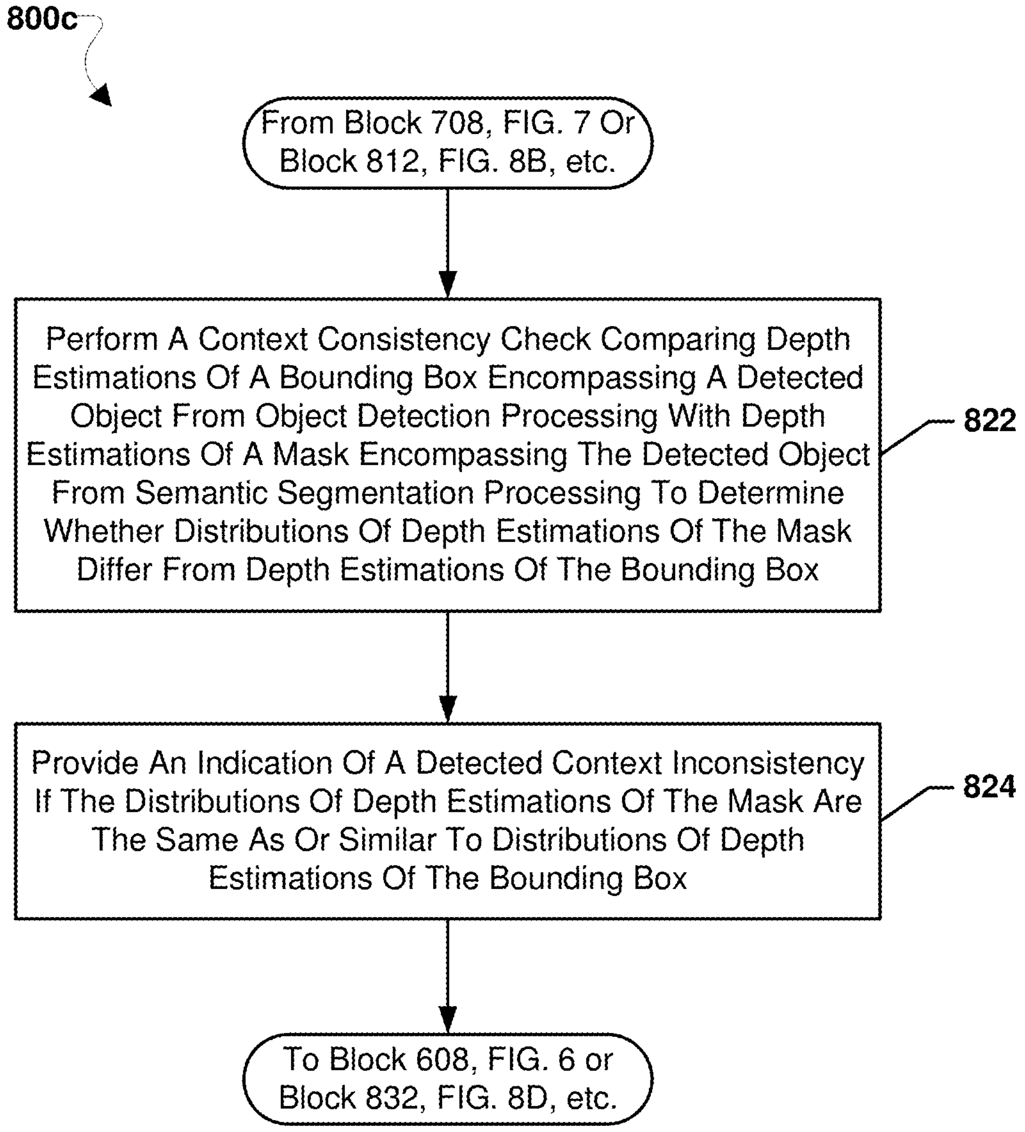

Referring to FIG. 8C, in block 822 of the method **800*c***, the processing system may perform operations including a context consistency check comparing depth estimations of a bounding box encompassing a detected object from object detection processing with depth estimations of a mask encompassing the detected object from semantic segmentation processing to determine whether distributions of depth estimations of the mask differ from depth estimations of the bounding box. As described herein, a context consistency check may include recognizing inconsistencies between the distributions of depth estimations of classification masks and distributions of depth estimations of the bounding box of a detected object.

In block 824, the processing system may perform operations including providing an indication of a detected context inconsistency if the distributions of depth estimations of the mask are the same as or similar to distributions of depth estimations of the bounding box. As described, this indication may be information provided to a decision process, information that may be included with or appending to object tracking information, information that may be included in or used to generate to a remote server, and/or another signal, information or response that enables an apparatus ADS or ADAS to respond to or accommodate the recognized inconsistency.

Thereafter, the processing system may perform the operations of block 606 of the method 600, as described, and/or other operations to check for inconsistencies in image processing such as performing operations in the methods **800*a* (FIG. 8A), 800*b* (FIG. 8B), and/or 800*d* (FIG. 8**D).

Figure 8D:
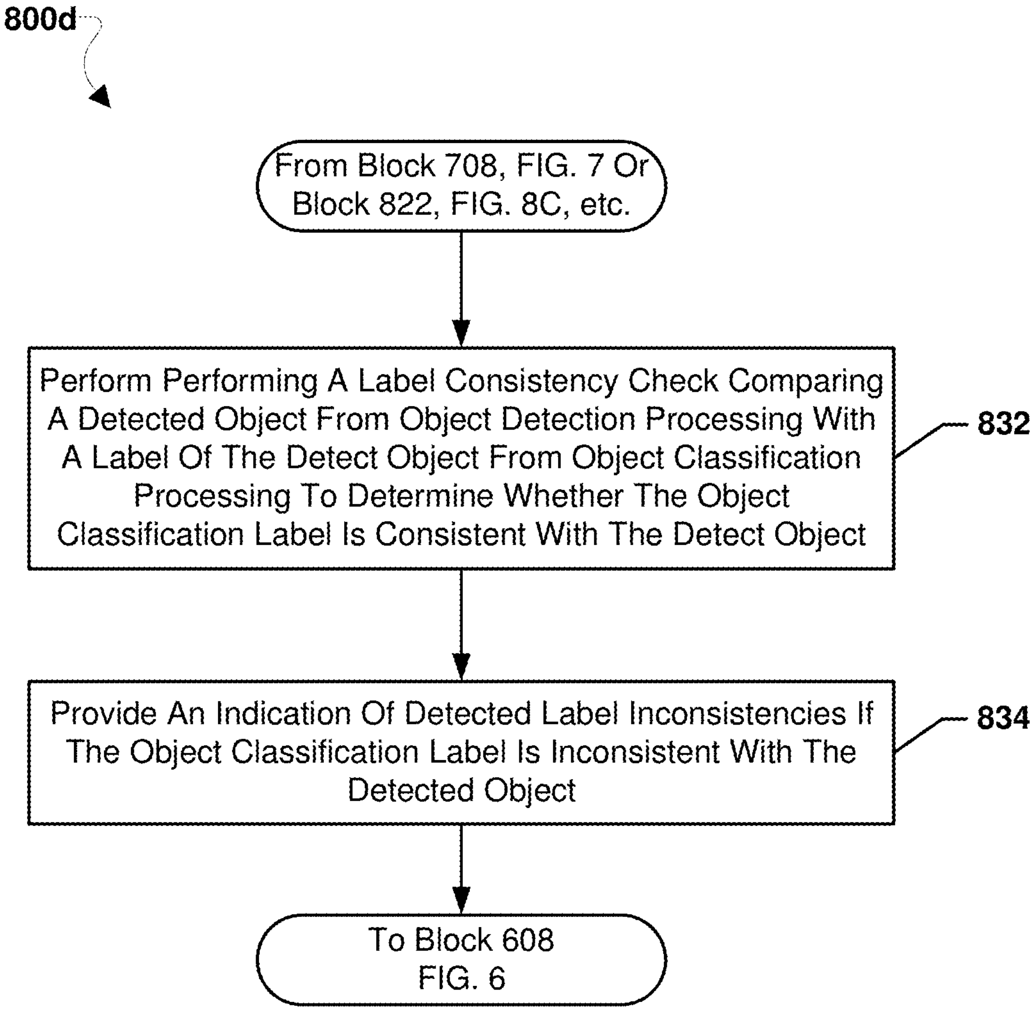

Referring to FIG. 8D, in block 832 of the method **800*d***, the processing system may perform operations including a label consistency check comparing a detected object from object detection processing with a label of the detect object from object classification processing to determine whether the object classification label is consistent with the detect object. As described herein, a label consistency check may include the processing system determine whether labels assigned to the same object or mask by the two labeling processes (semantic segmentation and object detection/classification) do not match or are in different distinct categories (e.g., “trees” vs. “automobile” or “traffic sign” vs. “pedestrian”).

In block 834, the processing system may perform operations including providing an indication of detected label inconsistencies if the object classification label is inconsistent with the detected object. As described, this indication may be information provided to a decision process, information that may be included with or appending to object tracking information, information that may be included in or used to generate to a remote server, and/or another signal, information or response that enables an apparatus ADS or ADAS to respond to or accommodate the recognized inconsistency.

Thereafter, the processing system may perform the operations of block 606 of the method 600, as described, and/or other operations to check for inconsistencies in image processing such as performing operations in the methods **800*a* (FIG. 8A), 800*b* (FIG. 8B), and/or 800*c* (FIG. 8**C).

Implementation examples are described in the following paragraphs. While some of the following implementation examples are described in terms of example systems and methods, further example implementations may include: the example operations discussed in the following paragraphs may be implemented by various computing devices; the example methods discussed in the following paragraphs implemented by an apparatus (e.g., a vehicle) including a processing system including one or more processors configured with processor-executable instructions to perform operations of the methods of the following implementation examples; the example methods discussed in the following paragraphs implemented by an apparatus including means for performing functions of the methods of the following implementation examples; and the example methods discussed in the following paragraphs may be implemented as a non-transitory processor-readable storage medium having stored thereon processor-executable instructions configured to cause a processing system of an apparatus to perform the operations of the methods of the following implementation examples.

Example 1. A method for detecting 1. A method for detecting vision attacks performed by a processing system on an apparatus, the method including: processing an image received from a camera of the apparatus using a plurality of trained image processing models to obtain a plurality of image processing outputs; performing a plurality of consistency checks on the plurality of image processing outputs, in which a consistency check of the plurality of consistency checks compares each of the plurality of image processing outputs to detect an inconsistency; detecting an attack on the camera based on the inconsistency; and performing a mitigation action in response to recognizing the attack.

Example 2. The method of example 1, in which processing the image received from the camera the apparatus using a plurality of trained image processing models to obtain a plurality of image processing outputs includes: performing semantic segmentation processing on the image using a trained semantic segmentation model to associate masks of groups of pixels in the image with classification labels; performing depth estimation processing on the image using a trained depth estimation model to identify distances to objects in the images; performing object detection processing on the image using a trained object detection model to identify objects in the images and define bounding boxes around identified objects; and performing object classification processing on the image using a trained object classification model to classify objects in the images.

Example 3. The method of example 2, in which performing the plurality of consistency checks on the plurality of image processing outputs includes: performing a semantic consistency check comparing classification labels associated with masks from semantic segmentation processing with bounding boxes of object detections in the image from object detection processing to identify inconsistencies between mask classifications and detected objects; and providing an indication of detected classification inconsistencies in response to a mask classification being inconsistent with a detected object in the image.

Example 4. The method of example 3, further including: in response to classification labels associated with masks from semantic segmentation processing being consistent with bounding boxes of object detections from object detection processing, performing a location consistency check comparing locations within the image of classification masks from semantic segmentation processing with locations within the image of bounding boxes of object detections in the images from object detection processing to identify inconsistencies in locations of classification masks with detected object bounding boxes; and providing an indication of detected classification inconsistencies if locations of classification masks are inconsistent with locations of detected object bounding boxes within the image.

Example 5. The method of any of examples 2-4, in which performing the plurality of consistency checks on the plurality of image processing outputs includes: performing depth plausibility checks comparing depth estimations of detected objects from object detection processing with depth estimates of individual pixels or groups of pixels from depth estimation processing to identify distributions in depth estimations of pixels across a detected object that are inconsistent with depth distributions associated with a classification of a mask encompassing the detected object from semantic classification processing; and providing an indication of a detected depth inconsistency if distributions in depth estimations of pixels across a detected object from depth distributions associated with a classification of a mask.

Example 6. The method any of examples 2-5, in which performing the plurality of consistency checks on the plurality of image processing outputs includes: performing a context consistency check comparing depth estimations of a bounding box encompassing a detected object from object detection processing with depth estimations of a mask encompassing the detected object from semantic segmentation processing to determine whether distributions of depth estimations of the mask differ from depth estimations of the bounding box; and providing an indication of a detected context inconsistency if the distributions of depth estimations of the mask are the same as or similar to distributions of depth estimations of the bounding box.

Example 7. The method of any of examples 2-6, in which performing the plurality of consistency checks on the plurality of image processing outputs includes: performing a label consistency check comparing a detected object from object detection processing with a label of the detect object from object classification processing to determine whether the object classification label is consistent with the detect object; and providing an indication of detected label inconsistencies if the object classification label is inconsistent with the detected object.

Example 8. The method of any of examples 2-7, in which performing a mitigation action in response to recognizing the attack includes adding indications of inconsistencies from each of the plurality of consistency checks to information regarding each detected object that provided is to an autonomous driving system for tracking detected objects.

Example 9. The method of any of examples 2-8, in which performing a mitigation action in response to recognizing the attack includes reporting the detected attack to a remote system.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments for reporting detections of vision attacks on an apparatus. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular. In addition, reference to the term "and/or" should be understood to include both the conjunctive and the disjunctive. For example, "A and/or B" means "A and B" as well as "A or B."

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processing system may perform operations using any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for detecting vision attacks performed by a processing system on an apparatus, the method comprising:

processing an image received from a camera of the apparatus using a plurality of trained image processing models to obtain a plurality of image processing outputs associated with the image, wherein processing the image comprises performing semantic segmentation on the image to associate masks of groups of pixels in the image with classification labels, performing object classification on the image using an object classification model to classify objects in the image, and performing depth estimation processing on the image using a trained depth estimation model to identify distances to the objects;

performing a plurality of consistency checks on the plurality of image processing outputs associated with the image, wherein a consistency check of the plurality of consistency checks compares each of the plurality of image processing outputs to detect an inconsistency between the plurality of image processing outputs, and wherein the plurality of consistency checks comprises performing a semantic consistency check comparing the classification labels with bounding boxes to identify inconsistencies between mask classifications and detected objects and performing depth plausibility checks comparing depth estimations of the detected objects with depth estimates of one or more pixels to identify distributions in depth estimations of the one or more pixels across a detected object that are inconsistent with depth distributions associated with a classification of a mask encompassing the detected object;

detecting an attack on the camera based on the inconsistency between the plurality of image processing outputs; and performing a mitigation action in response to recognizing the attack.

2. The method of claim 1, wherein processing the image received from the camera of the apparatus using the plurality of trained image processing models to obtain the plurality of image processing outputs further comprises:

performing object detection processing on the image using a trained object detection model to identify the objects in the image and define the bounding boxes.

3. The method of claim 1, wherein performing the plurality of consistency checks on the plurality of image processing outputs further comprises:

providing an indication of the inconsistencies in response to the classification of the mask being inconsistent with the detected object.

4. The method of claim 1, further comprising:

in response to the classification labels being consistent with the bounding boxes, performing a location consistency check comparing locations within the image of the masks with locations within the image of the bounding boxes to identify classification inconsistencies in locations of classifications of masks with the bounding boxes; and providing an additional indication of detected classification inconsistencies if locations of the classification of masks are inconsistent with locations of the bounding boxes.

5. The method of claim 1, wherein performing the plurality of consistency checks on the plurality of image processing outputs comprises:

providing an indication of a detected depth inconsistency if distributions in depth estimations of pixels across the detected object differ from depth distributions associated with the classification of the mask.

6. The method of claim 2, wherein performing the plurality of consistency checks on the plurality of image processing outputs further comprises:

performing a context consistency check comparing depth estimations of a bounding box encompassing a detected object with depth estimations of a mask encompassing the detected object from semantic segmentation processing to determine whether distributions of depth estimations of the mask differ from depth estimations of the bounding box; and providing an indication of a detected context inconsistency if the distributions of depth estimations of the mask differ from distributions of depth estimations of the bounding box.

7. The method of claim 2, wherein performing the plurality of consistency checks on the plurality of image processing outputs comprises:

performing a label consistency check comparing a detected object from object detection processing with a label of the detected object from object classification processing to determine whether the classification label is consistent with the detected object; and providing an indication of detected label inconsistencies if the classification label is inconsistent with the detected object.

8. The method of claim 1, wherein performing a mitigation action in response to recognizing the attack comprises adding indications of inconsistencies from each of the plurality of consistency checks to information regarding each detected object that is provided is to an autonomous driving system for tracking detected objects.

9. The method of claim 1, wherein performing a mitigation action in response to recognizing the attack comprises reporting the detected attack to a remote system.

10. An apparatus, comprising:

a processing system including one or more processors configured to:

process an image received from a camera of the apparatus using a plurality of trained image processing models to obtain a plurality of image processing outputs associated with the image, wherein to process the image, the one or more processors are configured to perform semantic segmentation on the image to associate masks of groups of pixels in the image with classification labels, perform object classification on the image using an object classification model to classify objects in the image, and perform depth estimation processing on the image using a trained depth estimation model to identify distances to objects in the image;

perform a plurality of consistency checks on the plurality of image processing outputs associated with the image, wherein a consistency check of the plurality of consistency checks compares each of the plurality of image processing outputs to detect an inconsistency between the plurality of image processing outputs, and wherein to perform the plurality of consistency checks, the one or more processors are configured to perform a semantic consistency check comparing the classification labels with bounding boxes to identify inconsistencies between mask classifications and detected objects and to perform depth plausibility checks comparing depth estimations of the detected objects with depth estimates of one or more pixels to identify distributions in depth estimations of the one or more pixels across a detected object that are inconsistent with depth distributions associated with a classification of a mask encompassing the detected object;

detect an attack on the camera based on the inconsistency between the plurality of image processing outputs; and perform a mitigation action in response to recognizing the attack.

11. The apparatus of claim 10, wherein to process the image received from the camera of the apparatus, the one or more processors are further configured to:

perform object detection processing on the image using a trained object detection model to identify the objects in the image and define the bounding boxes.

12. The apparatus of claim 10, wherein the one or more processors are further configured to perform the plurality of consistency checks on the plurality of image processing outputs, the one or more processors are further configured to:

provide an additional indication of the inconsistencies in response to the classification of the mask being inconsistent with the detected object.

13. The apparatus of claim 10, wherein, in response to the classification labels from semantic segmentation processing being consistent with the bounding boxes, the one or more processors are further configured to:

perform a location consistency check comparing locations within the image of the masks with locations within the image of the bounding boxes to identify classification inconsistencies in locations of classifications of masks with the bounding boxes; and provide an additional indication of detected classification inconsistencies if locations of the classification of masks are inconsistent with locations of the bounding boxes.

14. The apparatus of claim 10, wherein to perform the plurality of consistency checks on the plurality of image processing outputs, the one or more processors are further configured to:

provide an indication of a detected depth inconsistency if distributions in depth estimations of pixels across the detected object from depth distributions associated with the classification of the mask.

15. The apparatus of claim 11, wherein to perform the plurality of consistency checks on the plurality of image processing outputs, the one or more processors are further configured to:

perform a context consistency check comparing depth estimations of a bounding box encompassing a detected object with depth estimations of a mask encompassing the detected object from semantic segmentation processing to determine whether distributions of depth estimations of the mask differ from depth estimations of the bounding box; and provide an indication of a detected context inconsistency if the distributions of depth estimations of the mask differ from distributions of depth estimations of the bounding box.

16. The apparatus of claim 11, wherein to perform the plurality of consistency checks on the plurality of image processing outputs, the one or more processors are further configured to:

perform a label consistency check comparing a detected object with a label of the detected object from object classification processing to determine whether the classification label is consistent with the detected object; and provide an indication of detected label inconsistencies if the classification label is inconsistent with the detected object.

17. The apparatus of claim 10, wherein the one or more processors are further configured to perform a mitigation action in response to recognizing the attack that adds indications of inconsistencies from each of the plurality of consistency checks to information regarding each detected object that is provided is to an autonomous driving system for tracking detected objects.

18. The apparatus of claim 10, wherein the one or more processors are further configured to perform a mitigation action in response to recognizing the attack that reports the detected attack to a remote system.

19. A non-transitory processor-readable medium having stored thereon processor-executable instructions configured to cause a processing system of an apparatus to perform operations comprising:

processing an image received from a camera of the apparatus using a plurality of trained image processing models to obtain a plurality of image processing outputs associated with the image, wherein to process the image, the processor-executable instructions are further configured to cause the processing system to perform operations comprising: performing semantic segmentation on the image to associate masks of groups of pixels in the image with classification labels; performing object classification on the image using an object classification model to classify objects in the image; and performing depth estimation processing on the image using a trained depth estimation model to identify distances to objects in the image;

performing a plurality of consistency checks on the plurality of image processing outputs associated with the image, wherein a consistency check of the plurality of consistency checks compares each of the plurality of image processing outputs to detect an inconsistency between the plurality of image processing outputs, and wherein to perform the plurality of consistency checks, the processor-executable instructions are further configured to cause the processing system to perform operations comprising performing a semantic consistency check comparing the classification labels with bounding boxes to identify inconsistencies between mask classifications and detected objects and performing depth plausibility checks comparing depth estimations of the detected objects with depth estimates of one or more pixels to identify distributions in depth estimations of the one or more pixels across a detected object that are inconsistent with depth distributions associated with a classification of a mask encompassing the detected object;

detecting an attack on the camera based on the inconsistency between the plurality of image processing outputs; and performing a mitigation action in response to recognizing the attack.

20. The non-transitory processor-readable medium of claim 19, wherein the processor-executable instructions are further configured to cause the processing system to perform operations such that processing the image received from the camera of the apparatus using the plurality of trained image processing models to obtain the plurality of image processing outputs comprises:

performing object detection processing on the image using a trained object detection model to identify the objects and define the bounding boxes.

* * * * *